(12) United States Patent
Lopez et al.

(10) Patent No.: US 11,353,562 B2
(45) Date of Patent: Jun. 7, 2022

(54) INTEGRATED OPTICS QUANTUM WEAK MEASUREMENT AMPLIFICATION SENSOR FOR REMOTE SENSING

(71) Applicant: DRS Network & Imaging Systems, LLC, Melbourne, FL (US)

(72) Inventors: Marco A. Lopez, Villa Park, CA (US); Andrew Jordan, Rochester, NY (US); Kevin Lyons, Clifton Park, NY (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 283 days.

(21) Appl. No.: 16/660,437

(22) Filed: Oct. 22, 2019

(65) Prior Publication Data
US 2020/0124707 A1 Apr. 23, 2020

Related U.S. Application Data

(60) Provisional application No. 62/748,990, filed on Oct. 22, 2018.

(51) Int. Cl.
*G01H 9/00* (2006.01)
*G01S 17/58* (2006.01)
*G01S 7/484* (2006.01)

(52) U.S. Cl.
CPC .............. *G01S 7/484* (2013.01); *G01H 9/00* (2013.01); *G01S 17/58* (2013.01)

(58) Field of Classification Search
CPC ........ G01S 7/484; G01S 17/58; G01S 7/4818; G01S 7/4912; G01H 9/00
(Continued)

(56) References Cited

U.S. PATENT DOCUMENTS

| 5,835,199 A | 11/1998 | Phillips et al. |
| 7,106,448 B1 | 9/2006 | Vawter et al. |

(Continued)

OTHER PUBLICATIONS

Arbabi et al.,. "Measurements of the refractive indices and thermo-optic coefficients of $Si_3 N_4$ and $SiO_x$ using microring resonances", Optics Letters, vol. 38, No. 19, 2013, pp. 3878-3881.
(Continued)

*Primary Examiner* — Daniel L Murphy
(74) *Attorney, Agent, or Firm* — Kilpatrick Townsend & Stockton LLP

(57) ABSTRACT

Systems, devices, and methods for performing remote sensing using WMA. Embodiments include modulating an interrogation signal, transmitting the interrogation signal to a remote vibrating target, and receiving, at a first port of a WMA interferometer, a reflected signal. Embodiments also include splitting, by a first beam splitter, the reflected signal into first and second portions propagating down first and second waveguides, delaying, by a delay element, a phase of the reflected signal, and spatially phase shifting the reflected signal. Embodiments may further include splitting, by a second beam splitter, the first and second portions of the reflected signal into third and fourth portions propagating down the first and second waveguides, detecting an intensity difference between a first lobe and a second lobe of the third portion of the reflected signal, and calculating a Doppler frequency based on the intensity difference.

20 Claims, 21 Drawing Sheets

(58) Field of Classification Search
USPC .................................................. 356/28.5
See application file for complete search history.

(56) References Cited

U.S. PATENT DOCUMENTS

| | | | |
|---|---|---|---|
| 2005/0185191 A1 | 8/2005 | Shpantzer et al. | |
| 2009/0068668 A1 | 3/2009 | Duer | |
| 2017/0059301 A1 | 3/2017 | Rhoadarmer et al. | |
| 2017/0059392 A1 | 3/2017 | Lam et al. | |
| 2017/0241784 A1 | 8/2017 | Salit et al. | |
| 2021/0165102 A1* | 6/2021 | Crouch | G01S 7/4814 |

OTHER PUBLICATIONS

Bortolozzo et al., "Precision Doppler Measurements with Steep Dispersion", Optics Letters, vol. 38, No. 16, Aug. 15, 2013, pp. 3107-3110.

Dixon et al., "Ultrasensitive Beam Deflection Measurement via Interferometric Weak Value Amplification", Physical Review Letters, vol. 102 pp. 17360-1-173601-4., Jun. 26, 2009, pp. 17360-1-173601-4.

Dressel, "Weak values as interference phenomena", Phys. Review A., vol. 91, Mar. 18, 2015, pp. 032116-1-032116-14.

Hosten et al., "Observation of the Spin Hall Effect of Light via Weak Measurements", Science, vol. 319, Feb. 8, 2008, pp. 787-790.

Hu et al., "Gravitational Waves Detection via Weak Measurements Amplification", arXiv:1707.00886v2, Available Online at: https://arxiv.org/pdf/1707.00886.pdf, Nov. 2, 2017, pp. 1-5.

Nauriyal et al., "Fiber to Chip Fusion Splicing for Robust, Low Loss Photonic Packaging", Applied Physics, Oct. 3, 2018, pp. 1-12.

Nishizawa, "Weak Value Amplification and Beyond the Standard Quantum Limit in Position Measurements", Phys. Rev. A, vol. 92, Apr. 29, 2015, 13 pages.

PCT/US2019/057446, "International Search Report and Written Opinion", Jan. 14, 2020, 12 pages.

Starling et al., "Continuous Phase Amplification with a Sagnac Interferometer", Physical Review A, vol. 82, No. 1, Dec. 2009, 5 pages.

Starling et al., "Optimizing the Signal-to-Noise Ratio of a Beam-Deflection Measurement With Interferometric Weak Values", Physical Review A, vol. 80, No. 4, 2009, pp. 041803-1-041803-4.

Starling et al., "Precision Frequency Measurements with Interferometric Weak Values", Phys. Rev. A, vol. 82, Dec. 20, 2010, 4 pages.

Tamir et al., "Introduction to Weak Measurements and Weak Values", Quanta, vol. 2, Issue 1, May 2013, pp. 7-17.

Viza et al., "Experimentally Quantifying the Advantages of Weak-Values-Based Metrology", Phys. Rev. A, vol. 92, 2015, 11 pages.

Viza et al., "Weak Values Technique for Precision Measurements of Doppler Shifts", Optics Letters, vol. 38, Issue 16, Mar. 2013, 4 pages.

Application No. PCT/US2021/056643, International Search Report and Written Opinion, dated Jan. 26, 2022, 8 pages.

* cited by examiner

INTEGRATED OPTICS QUANTUM WEAK MEASUREMENT AMPLIFICATION SENSOR FOR REMOTE SENSING

CROSS-REFERENCES TO RELATED APPLICATIONS

This application claims priority to U.S. Provisional Application No. 62/748,990 filed on Oct. 22, 2018, the contents of which are incorporated by reference in their entirety for all purposes.

BACKGROUND OF THE INVENTION

Laser vibrometers have been used to make non-contact vibration measurements of a surface. In some instances, a test beam is transmitted to the surface of interest and a reflected laser beam is received and analyzed to extract a Doppler shift due to the motion of the surface of interest. A typical laser vibrometer requires access to a reference beam that is identical in frequency to the test beam. Prior to reaching the surface of interest, the test beam passes through a Bragg cell, which adds a frequency shift. The reflected beam has a frequency containing the frequency of the test beam, the frequency shift, and the Doppler shift. The reflected beam and the reference beam are fed into a photodetector and the Doppler shift is thereafter estimated by investigating the beat frequency between the two beams.

Despite the usefulness of conventional vibrometers in many applications, the requirement of access to a local copy of the test beam (i.e., a reference beam) makes the conventional approach ill suited for remote sensing. Accordingly, new systems, methods, and other techniques are needed.

SUMMARY OF THE INVENTION

In a first aspect of the present invention, a method of performing remote sensing using weak measurement amplification (WMA) is provided. The method may include modulating, by an interrogation laser of a transmitter module of a vibrometer, an interrogation signal at an interrogation frequency. The method may also include transmitting, by the transmitter module, the interrogation signal to a remote vibrating target. The method may further include receiving, at a first port of a WMA interferometer of a receiver module of the vibrometer, a reflected signal generated by the interrogation signal being reflected off the remote vibrating target. In some embodiments, the reflected signal contains the interrogation frequency and a Doppler frequency. The method may further include propagating the reflected signal down a first waveguide of the WMA interferometer. The method may further include splitting, by a first beam splitter of the WMA interferometer, the reflected signal into a first portion propagating down the first waveguide and a second portion propagating down a second waveguide of the WMA interferometer. The method may further include delaying, by a delay element (e.g., Bragg grating) of the WMA interferometer, a phase of one of the first and second portions of the reflected signal. The method may further include spatially phase shifting, by one or more spatial phase shifters of the WMA interferometer, one or both of the first and second portions of the reflected signal. The method may further include splitting, by a second beam splitter of the WMA interferometer, the first and second portions of the reflected signal into a third portion propagating down the first waveguide and a fourth portion propagating down the second waveguide. The method may further include detecting, by a split detector of the WMA interferometer, an intensity difference between a first lobe and a second lobe of the third portion of the reflected signal. The method may further include calculating, by a processor of the vibrometer, the Doppler frequency based on the intensity difference.

In some embodiments, the one or more spatial phase shifters include a mode exciter configured to excite a superposition of odd order modes in the reflected signal. In some embodiments, the method further includes expanding, by an afocal expander of the transmitter module, the interrogation signal. In some embodiments, the first beam splitter causes a first mode of the reflected signal to split between the first and second portions of the reflected signal. In some embodiments, the second beam splitter causes destructive interference of the first mode of the first and second portions of the reflected signal such that the third portion of the reflected signal does not contain the first mode. In some embodiments, the second beam splitter causes constructive interference of a second mode of the reflected signal such that the third portion of the reflected signal contains the second mode. In some embodiments, the method includes collecting, by a receiver telescope of the receiver module, the reflected signal from a specific target location within a field of view. In some embodiments, the method includes imaging, by the receiver telescope, the reflected signal onto a tapered fiber coupler coupled to the first port. In some embodiments, the first beam splitter is formed by positioning the first waveguide and the second waveguide within a threshold distance from each other. In some embodiments, the second beam splitter is formed by positioning the first waveguide and the second waveguide within a threshold distance from each other. In some embodiments, the delay element is positioned along the second waveguide so as to delay the phase of the second portion of the reflected signal.

In a second aspect of the present invention, a vibrometer for performing remote sensing using WMA is provided. The vibrometer may include a transmitter module configured to transmit an interrogation signal to a remote vibrating target. The transmitter module may include an interrogation laser configured to modulate the interrogation signal at an interrogation frequency. The vibrometer may also include a receiver module. The receiver module may include a WMA interferometer. The WMA interferometer may include a first port configured to receive a reflected signal generated by the interrogation signal being reflected off the remote vibrating target. In some embodiments, the reflected signal contains the interrogation frequency and a Doppler frequency. The WMA interferometer may also include a first waveguide coupled to the first port and configured to propagate the reflected signal. The WMA interferometer may further include a second waveguide. The WMA interferometer may further include a first beam splitter configured to split the reflected signal into a first portion propagating down the first waveguide and a second portion propagating down the second waveguide. The WMA interferometer may further include a delay element (e.g., Bragg grating) positioned along one of the first waveguide and the second waveguide and configured to delay a phase of one of the first and second portions of the reflected signal. The WMA interferometer may further include one or more spatial phase shifters configured to spatially phase shift one or both of the first and second portions of the reflected signal. The WMA interferometer may further include a second beam splitter configured to split the first and second portions of the reflected signal into a third portion propagating down the first waveguide and a fourth portion propagating down the second waveguide. The WMA interferometer may further include a split detector configured to detect an intensity difference between a first lobe and a second lobe of the third portion of the reflected signal. The vibrometer may further include a processor configured to calculate the Doppler frequency based on the intensity difference.

In some embodiments, the one or more spatial phase shifters include a mode exciter configured to excite a superposition of odd order modes in the reflected signal. In some embodiments, the transmitter module includes an afocal expander configured to expand the interrogation signal. In some embodiments, the first beam splitter causes a first mode of the reflected signal to split between the first and second portions of the reflected signal. In some embodiments, the second beam splitter causes destructive interference of the first mode of the first and second portions of the reflected signal such that the third portion of the reflected signal does not contain the first mode. In some embodiments, the second beam splitter causes constructive interference of a second mode of the reflected signal such that the third portion of the reflected signal contains the second mode. In some embodiments, the receiver module includes a receiver telescope configured to collect the reflected signal from a specific target location within a field of view and image the reflected signal onto a tapered fiber coupler coupled to the first port. In some embodiments, the first beam splitter is formed by positioning the first waveguide and the second waveguide within a threshold distance from each other. In some embodiments, the second beam splitter is formed by positioning the first waveguide and the second waveguide within a threshold distance from each other. In some embodiments, the delay element is positioned along the second waveguide so as to delay the phase of the second portion of the reflected signal.

In a third aspect of the present invention, an apparatus (e.g., a WMA interferometer) for performing remote sensing is provided. The apparatus may include a first port configured to receive a reflected signal generated by an interrogation signal being reflected off a remote vibrating target. In some embodiments, the interrogation signal is modulated at an interrogation frequency. In some embodiments, the reflected signal contains the interrogation frequency and a Doppler frequency. The apparatus may also include a first waveguide coupled to the first port and configured to propagate the reflected signal. The apparatus may further include a second waveguide. The apparatus may further include a first beam splitter configured to split the reflected signal into a first portion propagating down the first waveguide and a second portion propagating down the second waveguide. The apparatus may further include a delay element (e.g., Bragg grating) positioned along one of the first waveguide and the second waveguide and configured to delay a phase of one of the first and second portions of the reflected signal. The apparatus may further include one or more spatial phase shifters configured to spatially phase shift one or both of the first and second portions of the reflected signal. The apparatus may further include a second beam splitter configured to split the first and second portions of the reflected signal into a third portion propagating down the first waveguide and a fourth portion propagating down the second waveguide. The apparatus may further include a split detector configured to detect an intensity difference between a first lobe and a second lobe of the third portion of the reflected signal. In some embodiments, the Doppler frequency is calculated based on the intensity difference. In some embodiments, the one or more spatial phase shifters include a mode exciter configured to excite a superposition of odd order modes in the reflected signal.

Numerous benefits are achieved by way of the present invention. For example, with conventional laser Doppler vibrometers, a local oscillator or a local copy of the interrogation laser signal is required so as to detect the frequency differences between the interrogation laser signal and the reflected laser signal caused by the surface of interest. Additionally, embodiments of the present invention are not limited by the coherence length of the laser source, thereby extending the usable range of the device. Furthermore, embodiments of the present invention include a chip scale inteferometer that can be fabricated significantly more compactly and inexpensively compared to conventional interferometers. The chip scale interferometer is not limited to vibrometry applications, but can be used in a wide variety of frequency measurement systems. Examples of possible applications beyond vibrometry include a number of laboratory-scale measurement setups, medical imaging, telecommunication networks, navigation systems, radar systems, and the like. Other benefits of the present invention will be readily apparent to those skilled in the art.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Figure 1:
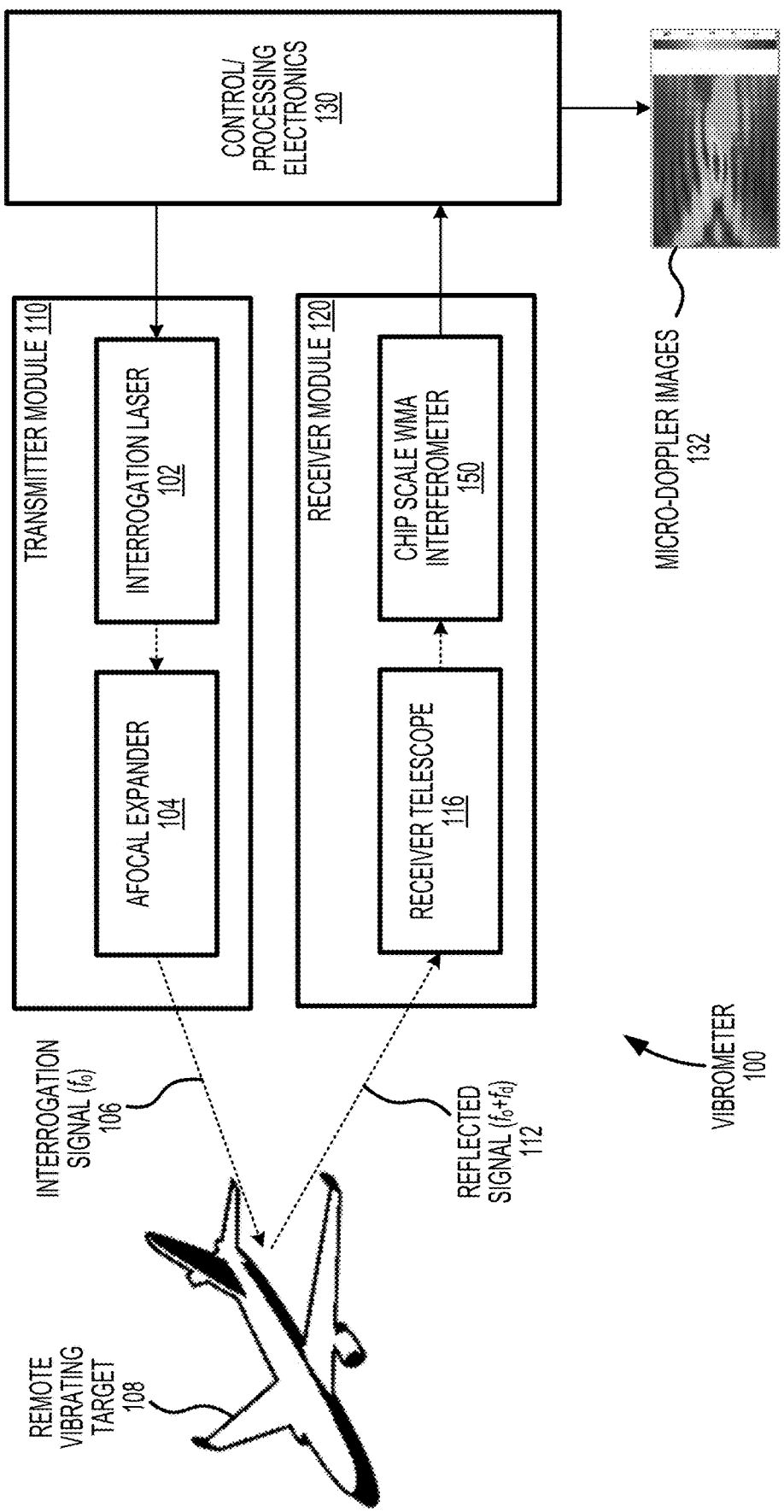
FIG. 1 illustrates a block diagram of a vibrometer.

Weak value amplification (WVA) and inverse weak value amplification (IWVA) using free space optics have enabled ultrasensitive measurements in applications such as beam deflection, frequency shifts, and phase shifts. The weak value technique allows the amplification of small signals by introducing a weak perturbation to the system and performing a post-selection to the data.

Bringing weak value techniques to the field of integrated photonics improves its applications. For example, it largely reduces the size of the measuring system to millimeter scale. Also, an integrated photonic device is inherently stable; therefore it is less susceptible to environmental factors such as vibrations. With an on-chip weak value amplification device, precision measurements can be carried out in a small volume with reliable performance.

In some instances, IWVA can be demonstrated using free space optics and a misaligned Sagnac interferometer. One goal may be to measure the relative phase shift $\phi$ between the two paths of the interferometer. The misalignment introduces a phase front tilt k to one path of the interferometer and −k to the other.

$$\psi_{\pm}(x) = \phi_0(x)e^{\pm i(kx-\frac{\phi}{2})}$$

When the two paths interfere at the beam splitter, considering a Gaussian input, the dark port becomes, $$\psi_D(x) \propto \psi_+(x) - \psi_-(x) = \frac{e^{-\frac{x^2}{4\sigma^2}}}{(2\pi\sigma^2)^{\frac{1}{4}}}\sin\left(kx - \frac{\phi}{2}\right)$$

By measuring the mean location shift $-\phi/(2k)$ of the dark port pattern, the phase shift $\phi$ is determined.

To bring free space IWVA to the integrated photonics regime, the above expressions are expanded into Hermite-Gaussian (HG) modes. The beams are composed mainly of the $HG_1$ mode with a small contribution of the $HG_0$ mode. Contribution of the higher modes is negligible. Therefore, the phase front tilt can be considered as coupling the initial $HG_0$ mode partially into the $HG_1$ mode.

$$\psi_{\pm}(x) \approx \left(1 \mp i\frac{\phi}{2}\right)HG_0 \pm ik\sigma HG_1$$

$$\psi_D(x) \propto i\frac{\phi}{2}HG_0 + ik\sigma HG_1$$

Eigenmodes of a waveguide are similar to Hermite-Gaussian modes. The theory described above can be applied to transverse electric (TE) waveguide eigenmodes $TE_0$ and $TE_1$. Assuming that a $TE_0$ mode is sent into an upper waveguide of the device, its device, its power is split in half and the fields become, $$E_1 = \frac{1}{\sqrt{2}}TE_0(x)$$

$$E_2 = \frac{1}{\sqrt{2}}TE_0(x)$$

Then a relative phase $\phi$ between the two paths is added, $$E_1 = \frac{e^{i\frac{\phi}{2}}}{\sqrt{2}}TE_0(x)$$

$$E_2 = \frac{e^{-i\frac{\phi}{2}}}{\sqrt{2}}TE_0(x)$$

Similar to the free space case, part of the $TE_0$ mode is coupled to the $TE_1$ mode with opposite phases in the two paths. a is the percentage of the $TE_0$ mode coupled to the $TE_1$ mode, which is a small number.

$$E_1 = \frac{e^{i\frac{\phi}{2}}}{\sqrt{2}}[(1-a)TE_0(x) + iaTE_1(x)]$$

$$E_2 = \frac{e^{-i\frac{\phi}{2}}}{\sqrt{2}}[(1-a)TE_0(x) + iaTE_1(x)]$$

After the two paths interfere at the second 50/50 splitter, the dark port becomes, $$E_d = E_1 - E_2 = i\left[(1-a)TE_0(x)\sin\frac{\phi}{2} + aTE_1(x)\cos\frac{\phi}{2}\right]$$

Since $\phi$ is very small, $$E_d \approx i\left[(1-a)\frac{\phi}{2}TE_0(x) + aTE_1(x)\right] = ia\left[\frac{(1-a)}{a}\frac{\phi}{2}TE_0(x) + TE_1(x)\right]$$

Therefore, by analyzing the ratio between the $TE_0$ and $TE_1$ modes, the phase $\phi$ can be determined.

Embodiments of the invention are related to methods and systems for performing long range vibrometry using weak measurement amplification (WMA). Specifically, embodiments relate to a chip scale integrated optics WMA sensor for detecting vibration signals of remote vibrating targets. According to some embodiments, an interrogation laser is transmitted toward a remote vibrating target and return vibration signals (micro-Doppler) are imaged with a chip scale WMA receiver sensor to produce target vibration profiles. This approach enables ultra-sensitive vibrometry without the need for long coherence length lasers and significantly reduces technical noise. The approach also enables longer range vibrometry missions than the current state of the art of commercial remote vibrometers. An integrated photonics implementation at the chip scale provides for significant reduction in platform vibration sensitivity of the vibrometer platform, allowing the WMA sensor to measure the target effects versus the platform effects. The implementation of weak value and inverse weak value based detection with several different interferometer geometries using guided waves in a monolithic geometry enables the implementation of the WVA effect in an ultra-small package (compared to conventional interferometer packages). This advances WMA to real world applications by reducing effects related to the vibrometer platform.

In some embodiments, a tapered fiber coupler couples light from a specific target location within the receiver's field of view onto an individual chip scale silicon waveguide, which is designed to form an interferometer by creating two beam splitters in the waveguide's propagation path. The signal injected into the waveguide from the remote vibrating target contains both the initial laser frequency (i.e., the interrogation frequency) and the Doppler and Micro-Doppler signals superimposed on top of the initial laser frequency (e.g., a THz laser frequency). The waveguide is designed with a given refractive index difference to create two modes of propagation, for example, by spatially varying the index of refraction across the transverse profile of the waveguide. The two beam splitters cause constructive interference of a higher, information-containing mode and destructive interference of the lowest mode.

FIG. 1 illustrates a block diagram of a vibrometer 100, according to some embodiments of the present invention. Vibrometer 100 includes a transmitter module 110 configured to transmit an interrogation signal 106 to a remote vibrating target 108 and a receiver module 120 configured to receive a reflected signal 112 generated by interrogation signal 106 being reflected off remote vibrating target 108. Transmitter module 110 may include an interrogation laser 102 for modulating interrogation signal 106 at an interrogation frequency $f_o$, typically in the THz frequency range. Optionally, an afocal expander 104 can be used to expand interrogation signal 106 prior to transmission thereof to reduce beam divergence. Receiver module 120 may include a receiver telescope 116 for collecting reflected signal 112 from a specific target location within the field of view of vibrometer 100 and for imaging reflected signal 112 onto a WMA interferometer 150. As described herein, WMA interferometer 150 processes reflected signal 112 in a way that allows extraction of a Doppler frequency $f_d$ introduced onto reflected signal 112 by remote vibrating target 108.

In some embodiments, vibrometer 100 includes control/processing electronics 130 that is communicatively coupled to each of transmitter module 110 and receiver module 120. For example, control/processing electronics 130 may send control signals to and receive information signals from each of transmitter module 110 and receiver module 120. According to at least one embodiment, control/processing electronics 130 may send a set of control signals to transmitter module 110 so as to turn on interrogation laser 102, set the interrogation frequency $f_o$, and cause interrogation laser 102 to point at remote vibrating target 108. The set of control signals may implement more sophisticated control algorithms in which, as an example, the interrogation frequency $f_o$ may be driven over a range of frequencies while remote vibrating target 108 is spatially scanned by directing interrogation laser 102 across the field of view. Control/processing electronics 130 may generate target vibration profiles such as Doppler images 132 based on the output of WMA interferometer 150.

Figure 2:
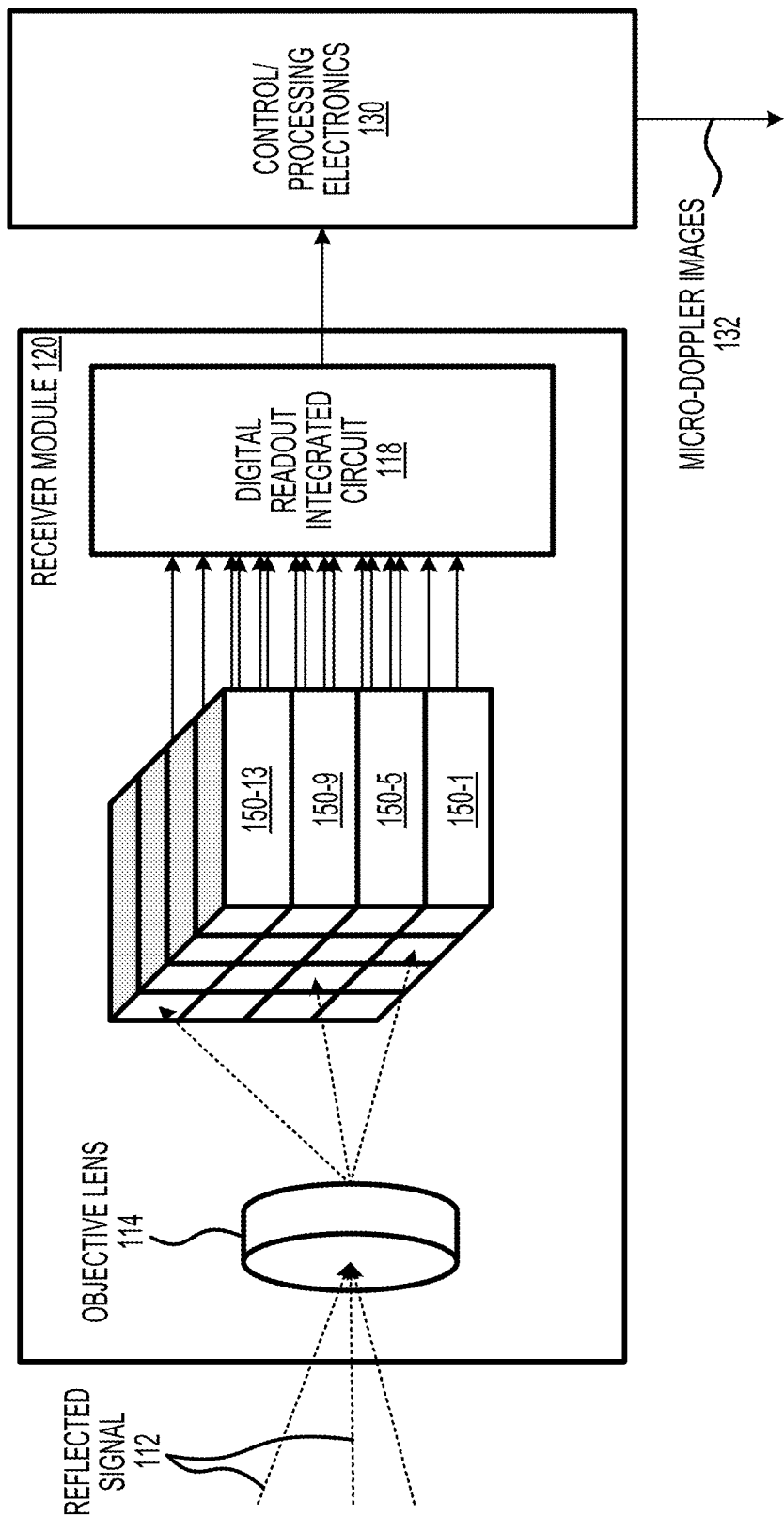
FIG. 2 illustrates an example of a vibrometer comprising a plurality of weak measurement amplification (WMA) interferometers.

FIG. 2 illustrates an example of vibrometer 100 comprising a plurality of WMA interferometers 150, according to some embodiments of the present invention. In some embodiments, receiver telescope 116 may include an objective lens 114 configured to image reflected signal 112 onto a particular WMA interferometer 150 of a plurality of WMA interferometers 150 based on the angle of arrival of reflected signal 112. In some embodiments, each of the plurality of WMA interferometers 150 corresponds to a pixel of Doppler image 132. Outputs of the plurality of WMA interferometers 150 may be fed into a digital readout integrated circuit 118 that processes the outputs and/or serializes the outputs into a data stream that is provided to control/processing electronics 130. In some embodiments, digital readout integrated circuit 118 behaves as a multiplexer that forwards one or more of the outputs of the plurality of WMA interferometers 150 as requested by control/processing electronics 130.

Figure 3:
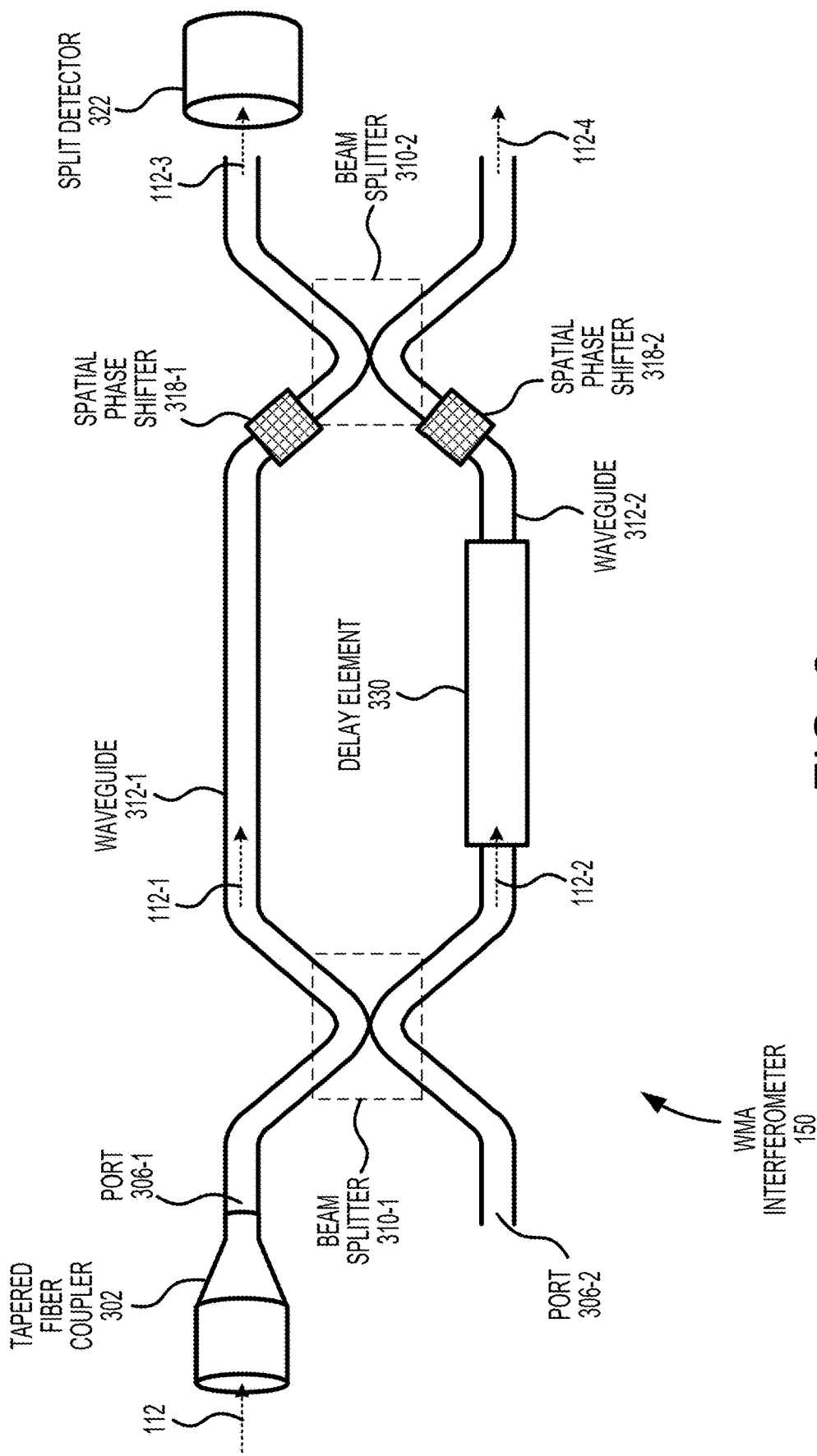
FIG. 3 illustrates an example of a WMA interferometer.

FIG. 3 illustrates an example of WMA interferometer 150, according to some embodiments of the present invention. WMA interferometer 150 includes a first waveguide 312-1 and a second waveguide 312-2 for propagating reflected signal 112. WMA interferometer 150 may include one or two input ports, such as a first port 306-1 coupled to first waveguide 312-1 and a second port 306-2 coupled to second waveguide 312-2. A tapered fiber coupler 302 may be coupled to first port 306-1 and may be configured to receive reflected signal 112. In the illustrated embodiment, second port 306-2 is coupled to vacuum or to an ambient atmosphere.

Portions of first waveguide 312-1 may be positioned in close proximity (e.g., within a threshold distance) to portions of second waveguide 312-2 to implement first beam splitter 310-1 and second beam splitter 310-2. First beam splitter 310-1 may be configured to split reflected signal 112 into a first portion of reflected signal 112-1 and a second portion of reflected signal 112-2, where first portion 112-1 corresponds to the portion of reflected signal 112 that propagates down first waveguide 312-1 after being split by first beam splitter 310-1 and second portion 112-2 corresponds to the portion of reflected signal 112 that propagates down second waveguide 312-2 after being split by first beam splitter 310-1. Second beam splitter 310-2 splits first portion of reflected signal 112-1 and second portion of reflected signal 112-2 into third portion of reflected signal 112-3 and fourth portion of reflected signal 112-4, where third portion 112-3 corresponds to the portion(s) of first portion 112-1 and second portion 112-2 that propagates down first waveguide 312-1 after being split by second beam splitter 310-2 and fourth portion 112-4 corresponds to the portion(s) of first portion 112-1 and second portion 112-2 that propagates down second waveguide 312-2 after being split by second beam splitter 310-2.

In the illustrated embodiment, WMA interferometer 150 includes a delay element 330, such as a Bragg grating, positioned along second waveguide 312-2 between beam splitters 310. In some embodiments, delay element 330 is positioned along first waveguide 312-1 between beam splitters 310. In some embodiments, two delay elements (e.g., two Bragg gratings) positioned along both of waveguides 312 are utilized. Delay element 330 may be configured to delay the phase of second portion of reflected signal 112-2 such that second portion 112-2 acquires a relative phase φ compared to first portion 112-1. This may be accomplished by fabricating delay element 330 to have a periodic variation in the index of refraction.

In some embodiments, WMA interferometer 150 includes a first spatial phase shifter 318-1 positioned along first waveguide 312-1 configured to spatially phase shift first portion of reflected signal 112-1 and a second spatial phase shifter 318-2 positioned along second waveguide 312-2 configured to spatially phase shift second portion of reflected signal 112-2 such that the transverse magnetic (TM) modes $TM_0$ and $TM_1$ (where TE and TM are different field representations for guided wave propagation in waveguides that are related by Maxwell's equations) acquire opposite tilted phase fronts resulting in a relative phase shift between the two modes. In some embodiments, an extra spatial phase shift is created of the form $e^{\pm iKx}$, which is equivalent to bringing out the next mode. In some embodiments, only a single spatial phase shifter is used. One or both of spatial phase shifters 318 may be positioned at different positions within WMA interferometer 150 than that shown in the illustrated embodiment, such as before delay element 330 and/or before beam splitter 310-1 (in reference to the direction of propagation). In some embodiments, one or both of spatial phase shifters 318 may include a mode exciter, such as a prism, fabricated within one or both of waveguides 312 configured to excite a superposition of odd order modes in reflected signal 112. The mode exciter may include a gradient in the index of refraction across the transverse profile of the waveguide causing some of the electric field amplitude to be transferred to the first excited mode. In some embodiments, spatial phase shifters 318 are implemented by widening waveguides 312 at a particular widening point along waveguides 312 such that only a single mode is supported prior to the widening point and a second mode is supported after the widening point.

In some embodiments, WMA interferometer 150 includes a split detector 322 coupled to first waveguide 312-1. Split detector 322 is configured to receive third portion of reflected signal 112-3 and detect an intensity difference S between a first lobe and a second lobe of third portion 112-3. Due to the $TM_0$ and $TM_1$ modes acquiring opposite tilted phase fronts during propagation in WMA interferometer 150, second beam splitter 310-2 causes destructive interference of the $TM_0$ mode and enhances the relative contribution of the $TM_1$ mode within third portion 112-3. Accordingly, a significant portion of the detectable power in third portion 112-3 resides in the information-containing $TM_1$ mode.

Figure 4:
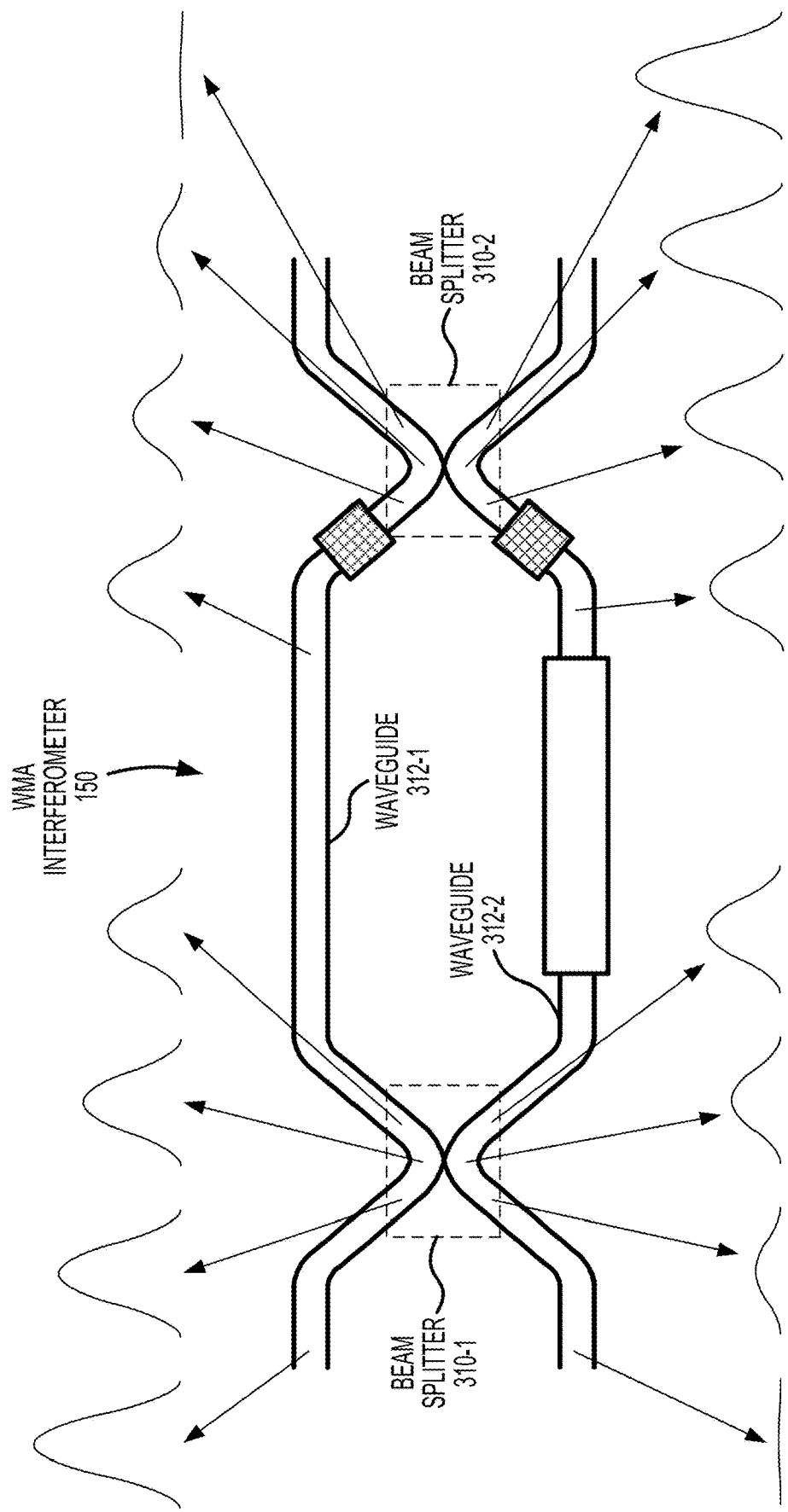
FIG. 4 illustrates an example of the signal intensity of the $TM_0$ mode of a reflected signal within a WMA interferometer.

FIG. 4 illustrates an example of the signal intensity of the $TM_0$ mode of reflected signal 112 within WMA interferometer 150, according to some embodiments of the present invention. Prior to reaching first beam splitter 310-1, power in the $TM_0$ mode is concentrated in first waveguide 312-1. When reflected signal 112 propagates through first beam splitter 310-1, power in the $TM_0$ mode is 50/50 split between waveguides 312. When reflected signal 112 propagates through second beam splitter 310-2, power in the $TM_0$ mode shifts to second waveguide 312-2.

Figure 5:
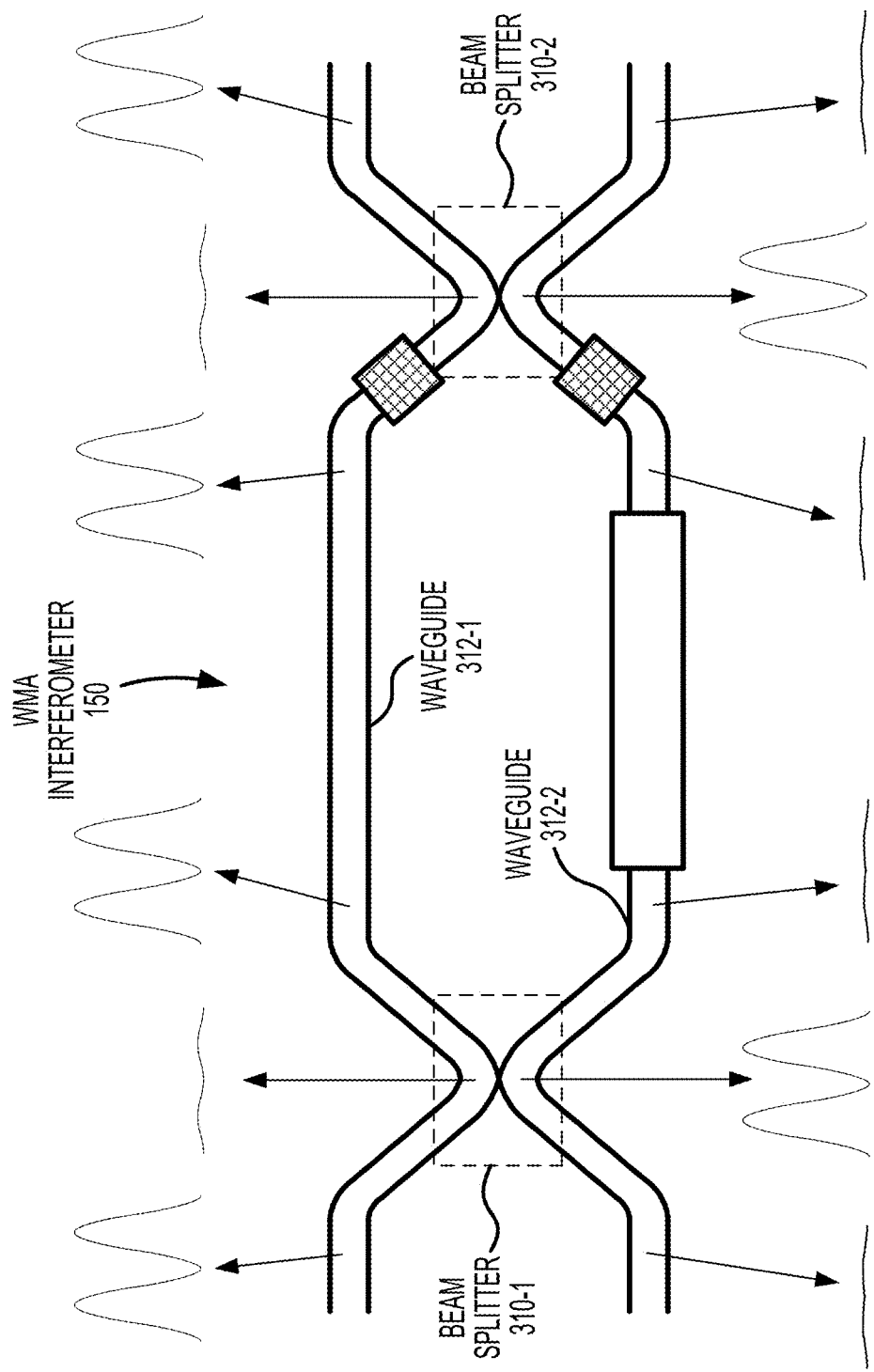
FIG. 5 illustrates an example of the signal intensity of the $TM_1$ mode of a reflected signal within a WMA interferometer.

FIG. 5 illustrates an example of the signal intensity of the $TM_1$ mode of reflected signal 112 within WMA interferometer 150, according to some embodiments of the present invention. Prior to reaching first beam splitter 310-1, power in the $TM_1$ mode is concentrated in first waveguide 312-1. When reflected signal 112 propagates through first beam splitter 310-1, power in the $TM_1$ mode remains in first waveguide 312-1. When reflected signal 112 propagates through second beam splitter 310-2, power in the $TM_1$ mode remains in first waveguide 312-1.

Figure 6:
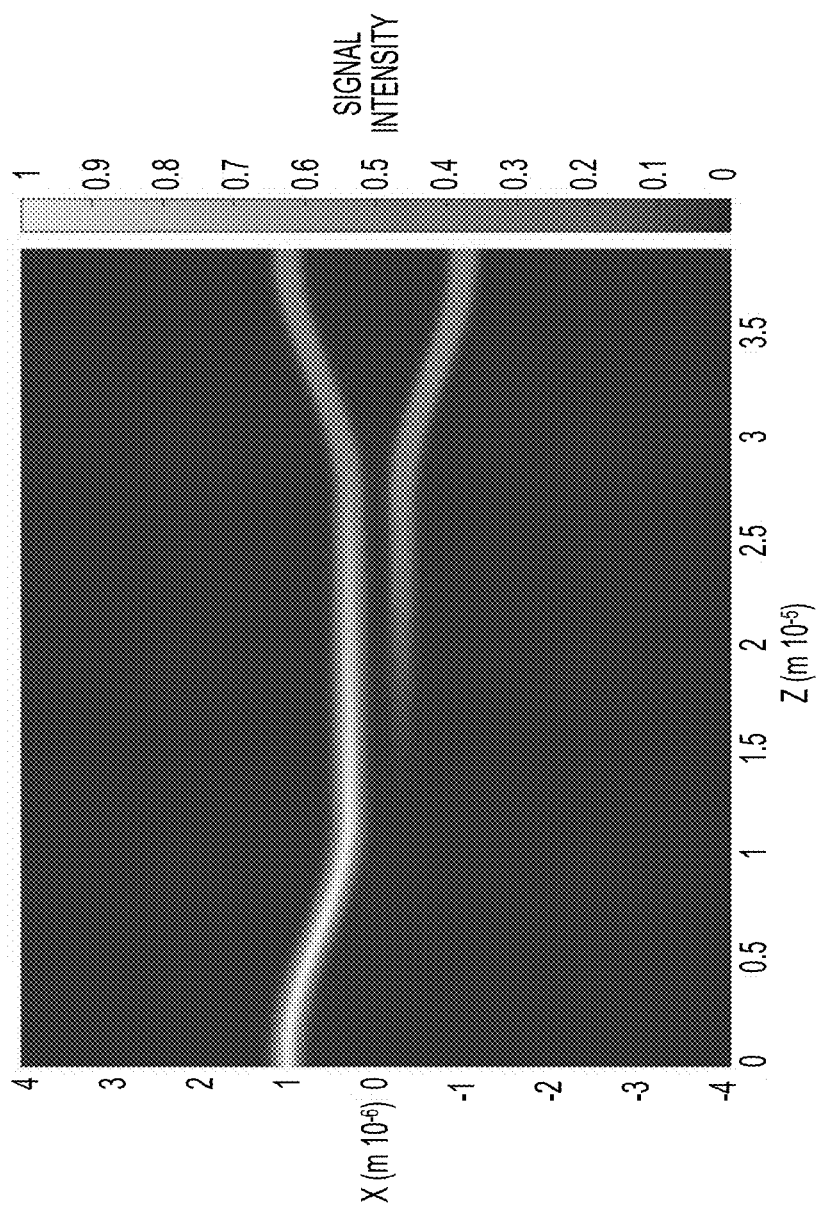
FIG. 6 illustrates an example of the power transfer between waveguides of the $TM_0$ mode.

FIG. 6 illustrates an example of the power transfer between waveguides of the $TM_0$ mode as the beam propagates along the Z-axis, according to some embodiments of the present invention. The Y-axis coming out of the page corresponds to signal intensity level, which is shown on the right. In the illustrated embodiment, the upper and lower waveguides are positioned sufficiently close over a particular propagation distance such that coupling by evanescent waves in the cladding causes power in the $TM_0$ mode to split 50/50 between the waveguides.

Figure 7:
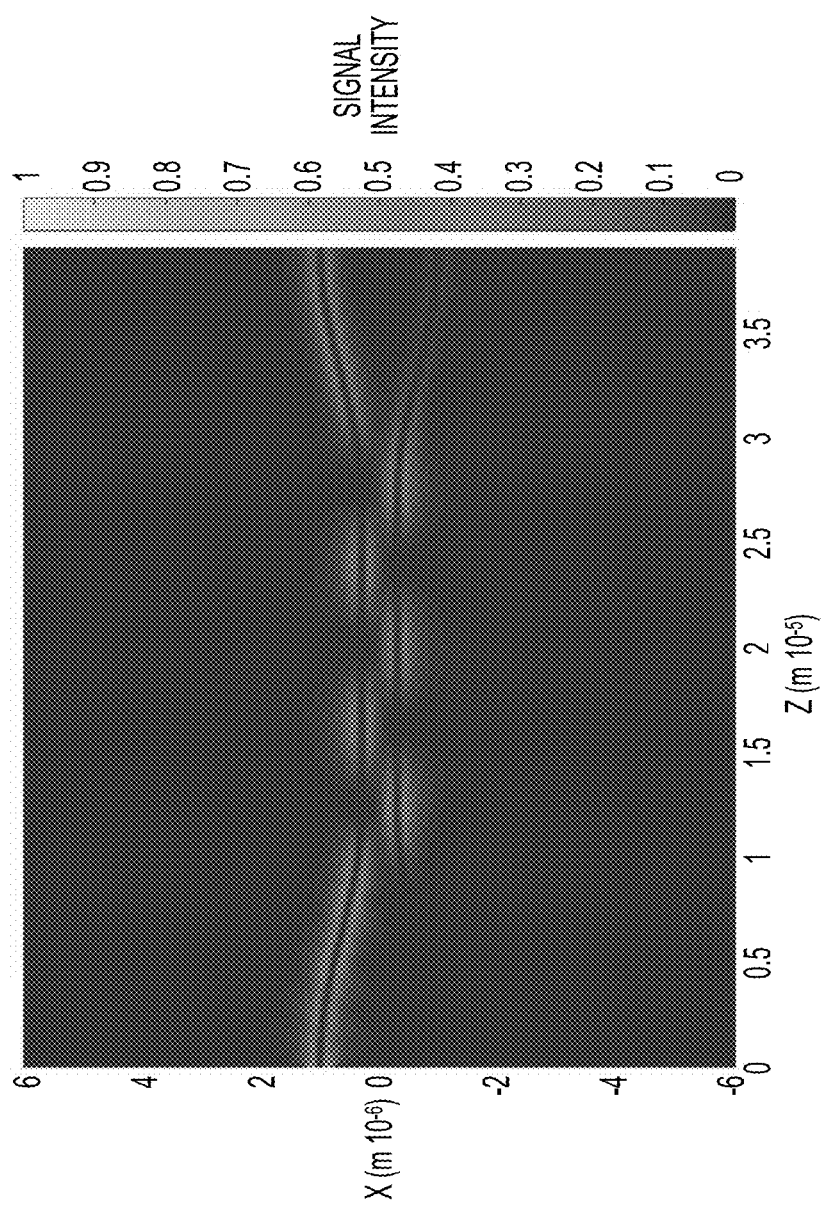
FIG. 7 illustrates an example of the power transfer between waveguides of the $TM_1$ mode.

FIG. 7 illustrates an example of the power transfer between waveguides of the $TM_1$ mode as the beam propagates along the Z-axis, according to some embodiments of the present invention. The Y-axis coming out of the page corresponds to signal intensity level, which is shown on the right. In the illustrated embodiment, the upper and lower waveguides are positioned sufficiently close over a particular propagation distance such that coupling by evanescent waves in the cladding causes power in the $TM_1$ mode to remain in the upper waveguide.

Figure 8:
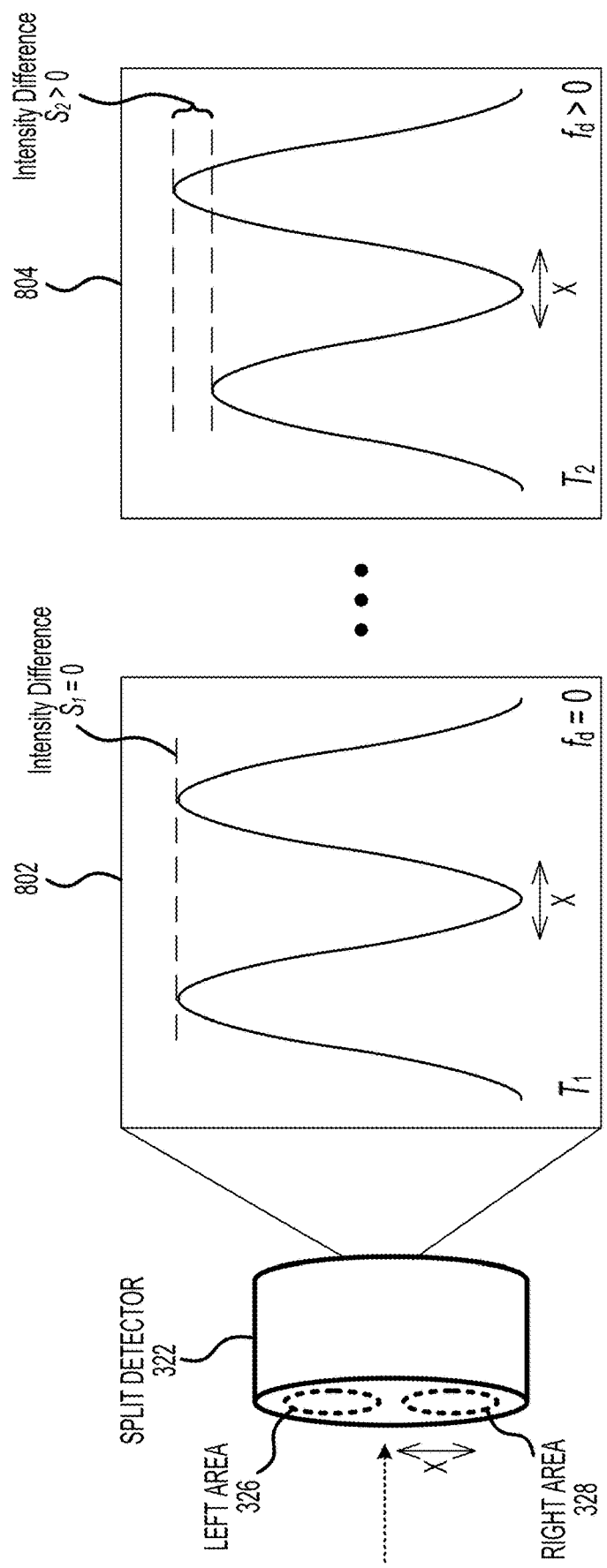
FIG. 8 illustrates an example of detection of the intensity difference S by a split detector.

FIG. 8 illustrates an example of detection of the intensity difference S by split detector 322, according to some embodiments of the present invention. In some embodiments, the intensity difference S may be calculated as $S=I_R-I_L$ where $I_R$ is the intensity of the right half of the waveguide and $I_L$ is the intensity of the left half of the waveguide. In some embodiments, the intensity difference S may be calculated as $S=(I_R-I_L)/(I_R+I_L)$. Split detector 322 may include a left area 326 and a right area 328 for detecting intensities $I_L$ and $I_R$, respectively. In the illustrated embodiment, an intensity difference of $S_1=0$ detected at time $T_1$ is shown in profile 802 and an intensity difference of $S_2>0$ detected at time $T_2$ is shown in profile 804.

In some embodiments, the intensity difference S may be used to calculate the Doppler frequency $f_d$ as follows. If the system is calibrated to a fiducial frequency ω (where the balanced signal is 0), then a slight change of frequency from remote vibrating target 108 will have the following chain of dependencies. The relative phase shift between the arms of the interferometer (i.e., first and second waveguides 312) is controlled by the combination $n(\omega)\omega\Delta L/c$, where n is the frequency-dependent index of refraction, ΔL is the path length difference, and c the speed of light. Therefore, a change of frequency δω will result in a change of relative phase of $\delta\phi=\delta\omega(\partial\omega/\partial\phi)^{-1}\approx\tau_g\delta\omega$, where $\tau_g\delta\omega$, is the "group delay", the amount of temporal delay a pulse of light will suffer going through the dispersive medium, which is proportional to the frequency derivative of the index of refraction. The normalized signal read out by the split detector $S=(I_R-I_L)/(I_R+I_L)$ is related to the relative phase φ by $S=c_m\phi/(\kappa d)$, where κ is the tilt of the phase front, d is the width of the waveguide (spatial spread of the mode), and $c_m$ is a constant related to the mode function. Thus, for small phase shifts, there is a linear relation between phase and detected signal. Combining the above observations, a shift in frequency δω is related to a shifted signal reading δS as follows: $\delta S=((c_m\tau_g)/\kappa d)\delta\omega$. Consequently, the larger the group delay, the more signal is obtained for the same amount of Doppler shift. Similarly, the 1/κ is the weak value amplification effect.

Figure 9:
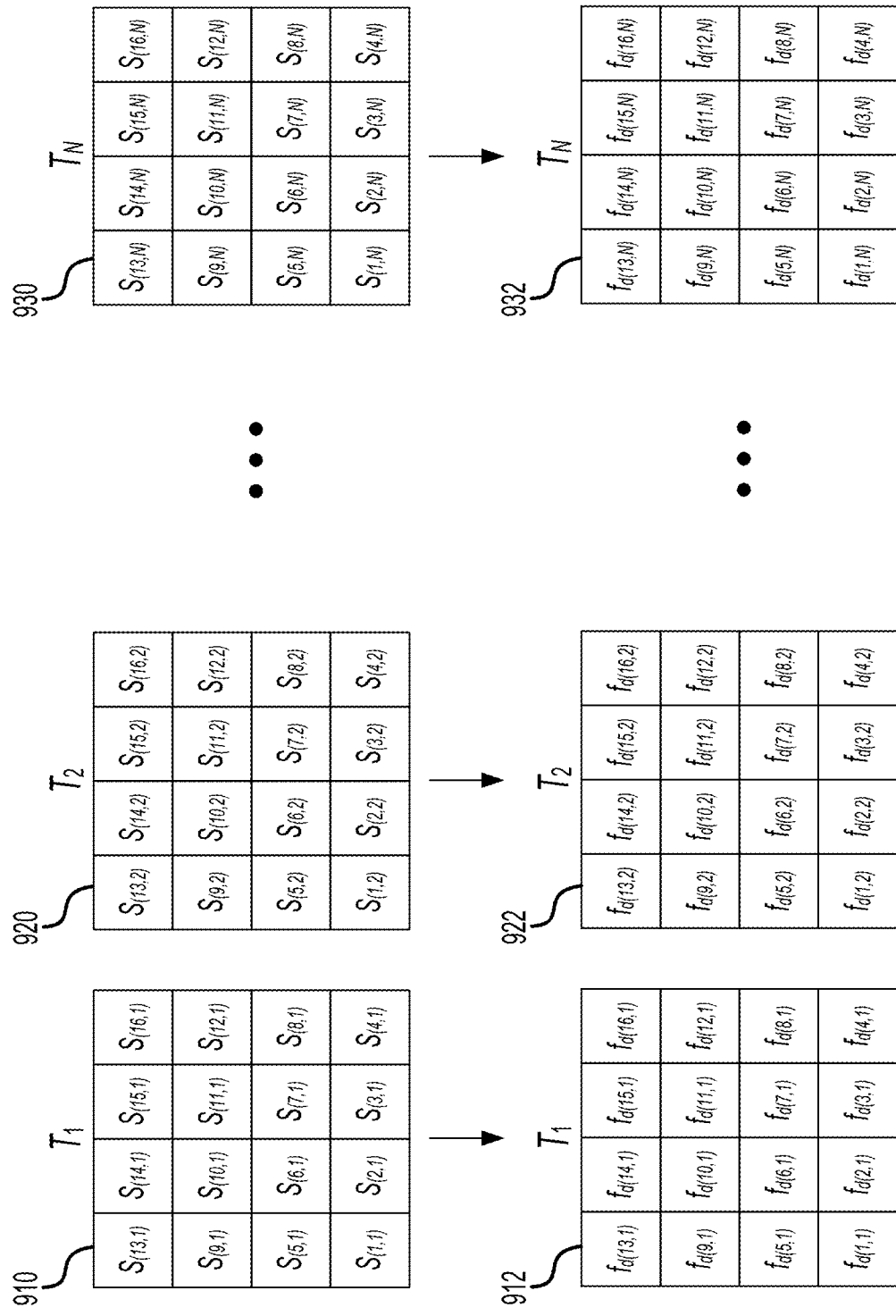
FIG. 9 illustrates spatial and temporal resolution of intensity differences S and Doppler frequencies $f_d$ corresponding to the embodiment shown in FIG. 2.

FIG. 9 illustrates spatial and temporal resolution of intensity differences S and Doppler frequencies $f_d$ corresponding to the embodiment shown in FIG. 2. Each of intensity differences S is characterized by two indexes: the particular WMA interferometer (numbered 1 through 16) that detected the intensity difference and the time (numbered 1, 2, ..., N) at which the intensity difference was detected. As illustrated, intensity differences S detected across time and spatial values are converted into Doppler frequencies $f_d$ over the same time and spatial values.

Referring once again to FIG. 9, the spatial map 910 of intensity difference S has been converted into a spatial map 912 of Doppler frequencies $f_d$ at a first time ($T_1$). Spatial maps of the intensity differences (spatial maps 920 and 930) are illustrated for a second time ($T_2$) and an Nth time, respectively. Additionally, spatial maps of Doppler frequencies $f_d$ (spatial maps 922 and 932) are illustrated for the second time ($T_2$) and the Nth time, respectively. Accordingly, embodiments of the present invention enable spatial maps of the vibrometry data associated with remote vibrating target 108 to be measured and subsequently utilized as appropriate to the particular application.

Figure 10A:
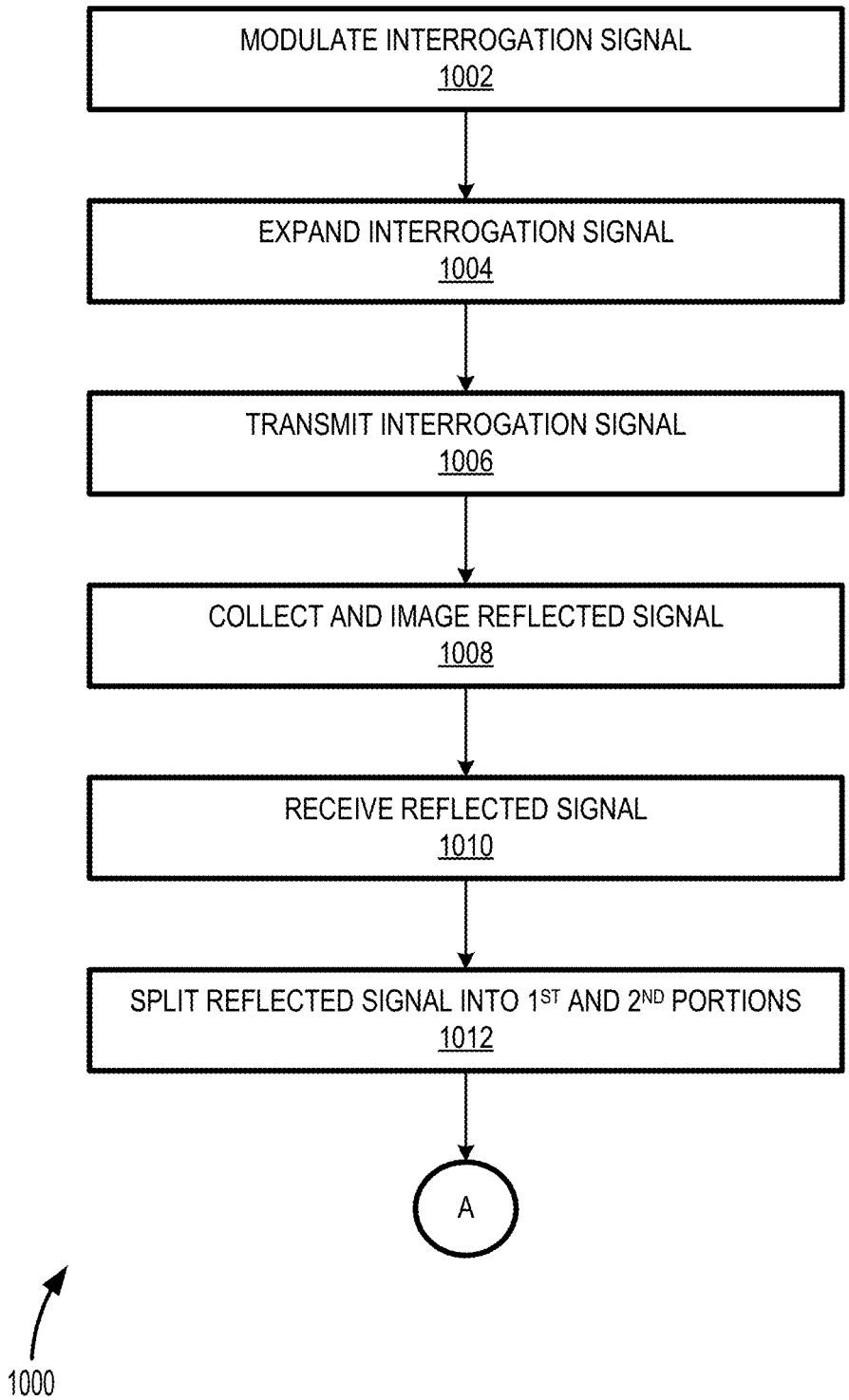
FIGS. 10A-10B illustrate a method of performing remote sensing using WMA.
Figure 10B:
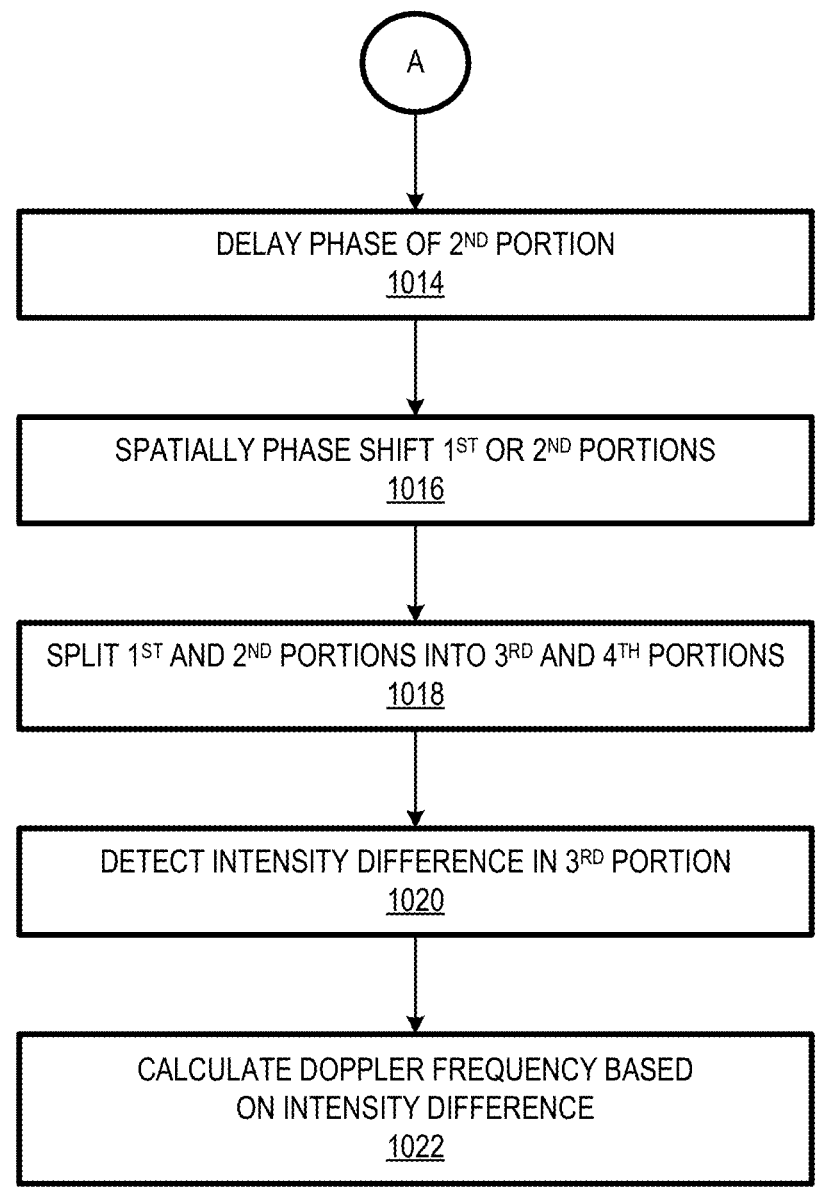

FIGS. 10A-10B illustrate a method 1000 of performing remote sensing using WMA, according to some embodiments of the present invention. One or more steps of method 1000 may be performed in a different order than the illustrated embodiment, and one or more steps of method 1000 may be omitted during performance of method 1000.

At step 1002, interrogation laser 102 modulates interrogation signal 106 at an interrogation frequency $f_o$. In some embodiments, the interrogation frequency $f_o$ is selected to be near the band gap of delay element 330. In various embodiments, the interrogation frequency $f_o$ may be any one of 400 THz, 450 THz, 500 THz, 550 THz, 600 THz, 650 THz, 700 THz, among other possibilities.

At step 1004, afocal expander 104 expands interrogation signal 102. In some embodiments, afocal expander 104 expands interrogation signal 102 to reduce beam divergence so as to maximize energy on remote vibrating target 108. In some embodiments, afocal expander 104 includes objective lens 114.

At step 1006, transmitter module 110 transmits interrogation signal 106 to remote vibrating target 108. In some embodiments, step 1006 may include interrogation laser 102 transmitting interrogation signal 106 through afocal expander 104 toward remote vibrating target 108. When interrogation signal 106 is reflected by remote vibrating target 108, a target-own platform Doppler shift is introduced by remote vibrating target 108 and a target micro-Doppler shift is induced by localized surface vibrations on remote vibrating target 108.

At step 1008, receiver telescope 116 collects reflected signal 112 from a specific target location within the field of view of vibrometer 100 and images reflected signal 112 onto tapered fiber coupler 302. In some embodiments, the receiver telescope 116 may image reflected signal 112 onto a particular tapered fiber coupler 302 of a plurality of tapered fiber couplers based on the angle of arrival of reflected signal 112.

At step 1010, first port 306-1 receives reflected signal 112. In some embodiments, step 1010 includes first port 306-1 receiving reflected signal 112 from tapered fiber coupler 302. Concurrently with or subsequent to step 1010, first waveguide 312-1 may receive reflected signal 112 via first port 306-1 and reflected signal 112 may propagate down first waveguide 312-1.

At step 1012, first beam splitter 310-1 splits reflected signal 112 into first portion of reflected signal 112-1 and second portion of reflected signal 112-2, where first portion 112-1 corresponds to the portion of reflected signal 112 that propagates down first waveguide 312-1 after being split by first beam splitter 310-1 and second portion 112-2 corresponds to the portion of reflected signal 112 that propagates down second waveguide 312-2 after being split by first beam splitter 310-1. In some embodiments, first beam splitter 310-1 is formed by positioning first and second waveguides 312 within a threshold distance from each other such that reflected signal 112 is coupled into first and second waveguides 312 via evanescent wave coupling. By bringing first and second waveguides 312 sufficiently close, coupling by evanescent waves in the cladding causes power to shift between each waveguide as a function of propagation distance. Such an effect can be utilized to create a reliable analog for a free space 50/50 beam splitter.

At step 1014, delay element 330 delays the phase of second portion of reflected signal 112-2 such that second portion 112-2 acquires a relative phase $\varphi$ compared to first portion 112-1. In some embodiments, delay element 330 includes a Bragg grating. In some embodiments, delay element 330 may be fabricated to have a periodic variation in the index of refraction. Traveling waves within delay element 330 have solutions that yield a photonic bandgap that implies competition between high dispersion and high transmission. In some embodiments, a double Bragg grating may be employed having two band gaps with couplings $\kappa_1$ and $\kappa_2$ providing two spatial wavelengths. Such embodiments comprising two band gaps create a frequency window of high transmission, high dispersion, and low group velocity.

Although delay element 330 is described herein as being positioned along second waveguide 312-2, in some embodiments delay element 330 may be positioned along first waveguide 312-1 so as to delay the phase of first portion of reflected signal 112-2. In some embodiments, a first delay element may be positioned along first waveguide 312-1 so as to delay the phase of first portion 112-1 and a second delay element may be positioned along second waveguide 312-2 so as to delay the phase of second portion 112-2. In some embodiments, delay element 330 acts like a Rubidium cell that may be implemented in free space embodiments, causing a relative phase $\varphi$ between the two arms.

At step 1016, first spatial phase shifter 318-1 positioned along first waveguide 312-1 spatially phase shifts first portion of reflected signal 112-1 and second spatial phase shifter 318-2 positioned along second waveguide 312-2 spatially phase shifts second portion of reflected signal 112-2 such that the modes $TM_0$ and $TM_1$ (where TM modes and TE modes are interrelated as indicated previously) acquire opposite tilted phase fronts resulting in a relative phase shift between the two modes. In some embodiments, only a single spatial phase shifter is used. In some embodiments, one or both of first-spatial phase shifter 318-1 and second-spatial phase shifter 318-2 are configured to excite a superposition of odd order modes in first portion 112-1 and second portion 112-2, respectively. This may be accomplished by fabricating a prism within one or both of first waveguide 312-1 and second waveguide 312-2. For example, the prism may include a gradient in the index of refraction across the transverse profile of first waveguide 312-1 and/or second waveguide 312-2 causing some of the electric field amplitude to be transferred to the first excited mode. In some embodiments, the prism may excite a superposition of odd order modes from an initial zeroth-order mode input. The prism may thereby cause reflected signal 112 to propagate in accordance with two modes of propagation.

At step 1018, second beam splitter 310-2 splits first portion of reflected signal 112-1 and second portion of reflected signal 112-2 into third portion of reflected signal 112-3 and fourth portion of reflected signal 112-4, where third portion 112-3 corresponds to the portion(s) of first portion 112-1 and second portion 112-2 that propagates down first waveguide 312-1 after being split by second beam splitter 310-2 and fourth portion 112-4 corresponds to the portion(s) of first portion 112-1 and second portion 112-2 that propagates down second waveguide 312-2 after being split by second beam splitter 310-2. In some embodiments, second beam splitter 310-2 is formed by positioning first and second waveguides 312 within a threshold distance from each other such that first portion 112-1 and second portion 112-2 are coupled into first and second waveguides 312 via evanescent wave coupling. Due to the $TM_0$ and $TM_1$ modes acquiring opposite tilted phase fronts in step 1018, second beam splitter 310-2 causes destructive interference of the $TM_0$ mode and enhances the relative contribution of the $TM_1$ mode within third portion 112-3.

At step 1020, split detector 322 receives third portion of reflected signal 112-3 and detects an intensity difference S between a first lobe and a second lobe of third portion 112-3. When WMA interferometer 150 is tuned to operate in the inverse weak value region, a double lobe pattern is produced on split detector 322. In some embodiments, split detector 322 comprises a two element detector or two separate detectors having a right-side and a left-side. In some embodiments, split detector 322 identifies two relative maximum intensity values and determines a difference between them. In some embodiments, split detector 322 determines two intensity values at two predetermined spatial positions (e.g., $x=\pm 1 \cdot 10^{-6}$ m). In some embodiments, a Y-branch may be used to spatially split the profile of third portion 112-3 to measure and detect the intensity difference S.

At step 1022, a processor of vibrometer 100 calculates the Doppler frequency $f_d$ based on the intensity difference S. When WMA interferometer 150 is properly tuned, the intensity difference S will shift due to changes in frequency (Doppler change). As such, the rate of change of the intensity difference S with respect to the rate of change in frequency can be calculated. Step 1022 may be performed by a processor within receiver module 120 or control/processing electronics 130, among other possibilities.

Figure 11:
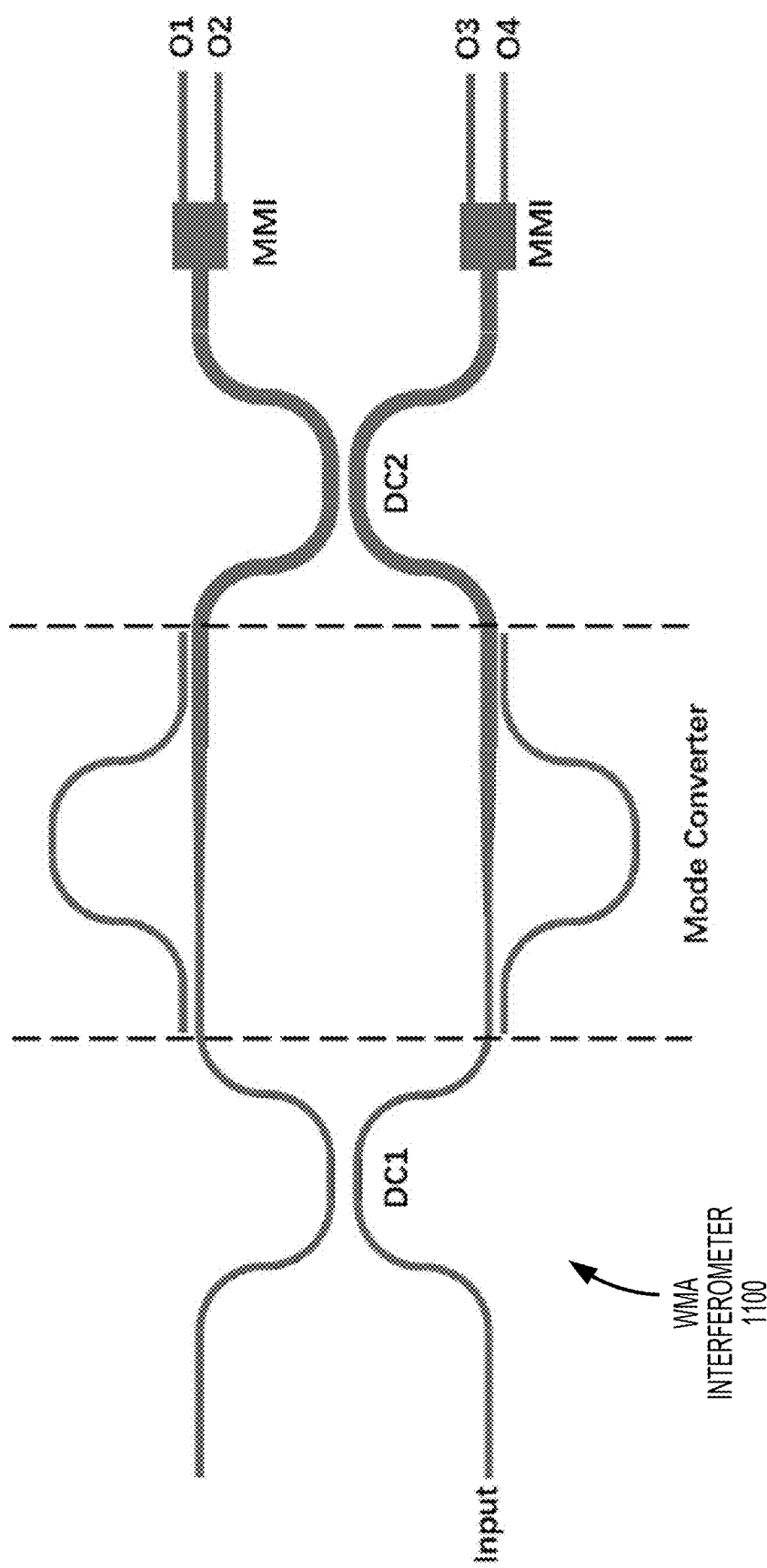
FIG. 11 illustrates an example layout of a WMA interferometer.

FIG. 11 illustrates an example layout of a WMA interferometer 1100, according to some embodiments of the present invention. WMA interferometer 1100 includes a first and second directional couplers (DC1 and DC2), multi-mode interferometers (MMI), and outputs (O1, O2, O3, and O4). In some embodiments, for the design of the device, silicon nitride can be used as the guiding material, silicon dioxide can be used as the cladding material, and the testing wavelength can be 1550 nm. These materials and wavelength have good compatibility with existing fabrication and testing techniques. A thickness of 300 nm for silicon nitride is chosen for balance of confinement and ease of coupling.

A free space Mach-Zander interferometer can be achieved by two beam-splitters. On a photonic chip, the analog of a beam-splitter is a directional coupler. When two waveguides are close and the modes in them are phase matched, light in one of the waveguides will couple to the other. The coupling ratio depends on the separation between the two waveguides and the length of the coupling region. This structure is called a directional coupler.

Figure 12:
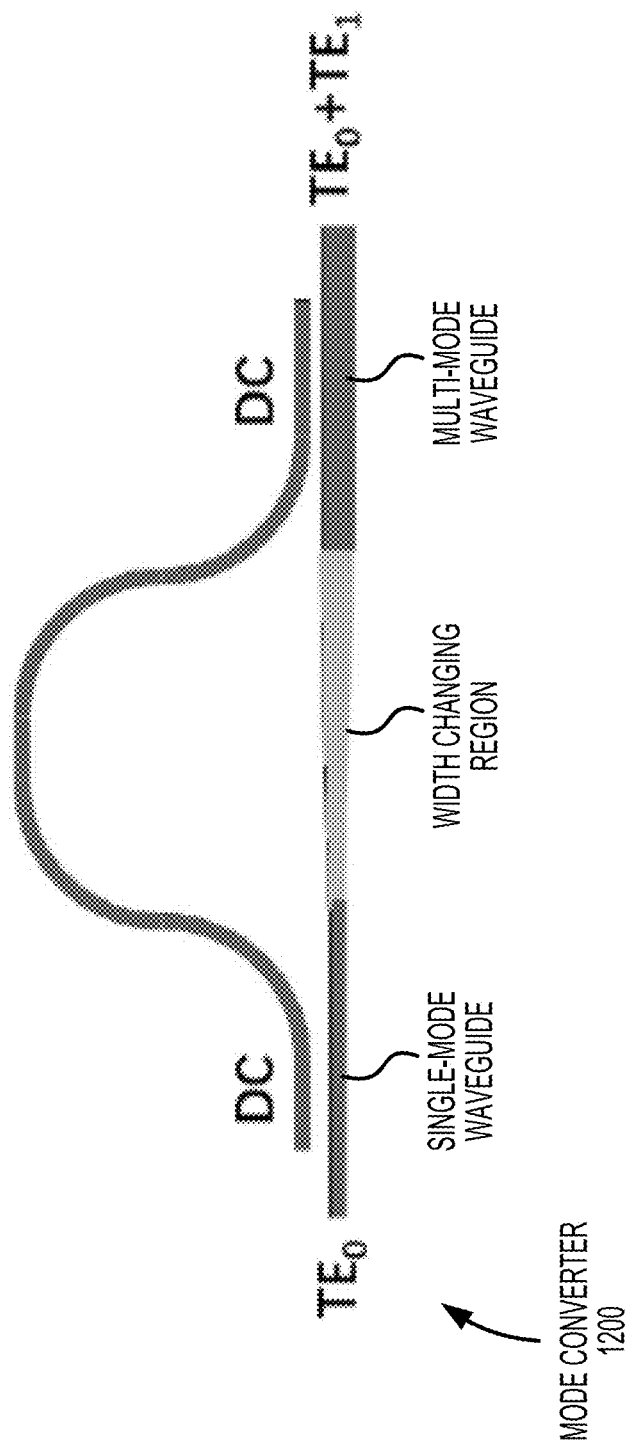
FIG. 12 illustrates an example layout of a mode converter.

FIG. 12 illustrates an example layout of a mode converter 1200, according to some embodiments of the present invention. Mode converter 1200 can be used to introduce a phase front tilt by coupling part of the fundamental mode ($TE_0$) to the second order mode ($TE_1$). The input waveguide $W_1$, which may be the bottom waveguide, may be a single mode waveguide that only supports the $TE_0$ mode. At the first directional coupler, a small portion of the input $TE_0$ mode is coupled to the $TE_0$ mode of an identical waveguide $W_2$, which may be the top waveguide. $W_1$ then enters a tapering region where the width of $W_1$ gradually increases until it becomes a multimode waveguide that supports both the $TE_0$ and $TE_1$ modes. Because the change in width is slow, light in the $TE_0$ mode will tend to stay confined in the $TE_0$ mode instead of coupling to higher order modes and dissipating.

The $TE_1$ mode supported by $W_1$ can be designed to be phase matched with $TE_0$ in $W_2$. Therefore, at the second directional coupler, $TE_0$ in $W_2$ will couple to $TE_1$ in $W_1$. Since $TE_0$ in $W_1$ is not phase matched with any mode in $W_2$, it will stay in $W_1$. As a result, $W_1$ will contain mostly the $TE_0$ mode with a small amount of the $TE_1$ mode at the end of this structure. The ratio between the two modes depends on the coupling ratio of the first directional coupler. And the phase difference between the two modes depends on the optical path difference of $W_1$ and $W_2$ between the two couplers.

Figure 13:
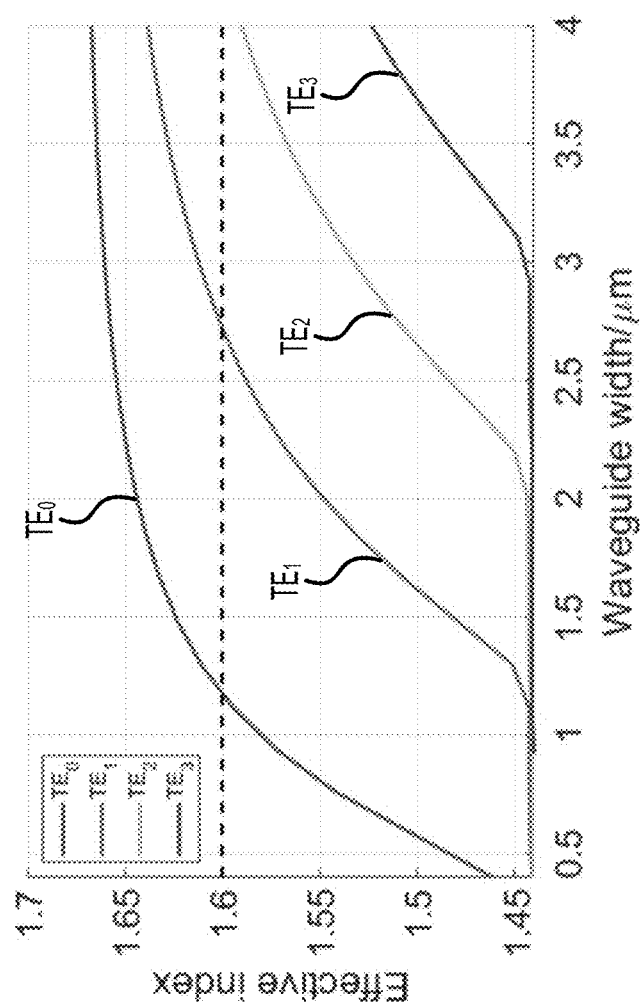
FIG. 13 illustrates a plot showing the mode effective index change as a function of waveguide width.

FIG. 13 illustrates a plot showing the mode effective index change as a function of waveguide width, according to some embodiments of the present invention. FIG. 13 demonstrates that the widths of the waveguide can be designed to match the $TE_0$ and $TE_1$ modes with an effective index of 1.6, which corresponds to a width of 1.2 μm for $W_2$ and 2.75 μm for $W_1$.

Figure 14:
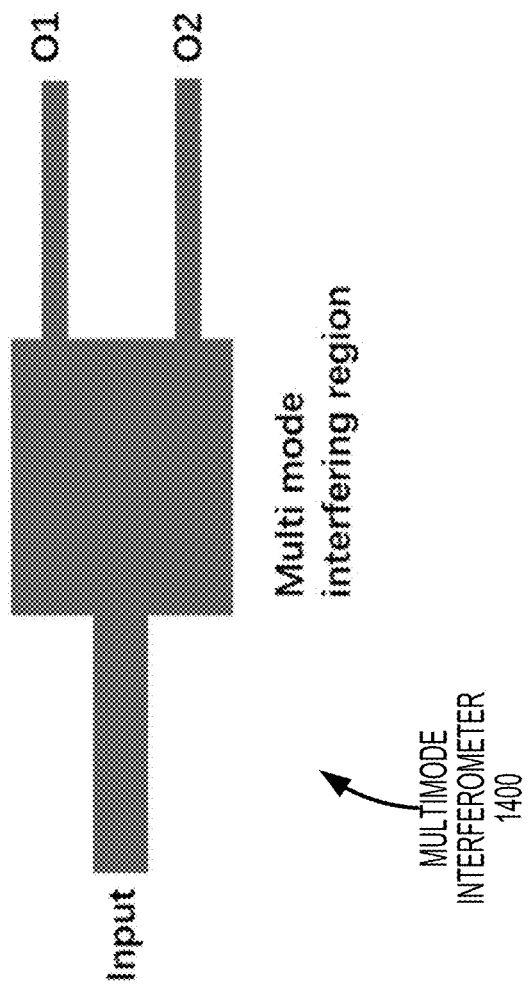
FIG. 14 illustrates an example layout of a multimode interferometer.

FIG. 14 illustrates an example layout of a multimode interferometer 1400, according to some embodiments of the present invention. In some embodiments, the mean location shift can be measured by measuring the ratio of $TE_0$ and $TE_1$ mode in the dark port. Therefore, a multimode interference waveguide can be used, which reacts differently to the $TE_0$ and $TE_1$ modes. An multimode interference waveguide is a segment of waveguide that supports many modes followed by two single mode waveguides. In the multimode interference region, light is coupled to a number of modes, which have different propagation velocity. Therefore, their interference pattern changes as they propagate, thus changing the output power of the two single mode waveguides.

Figure 15:
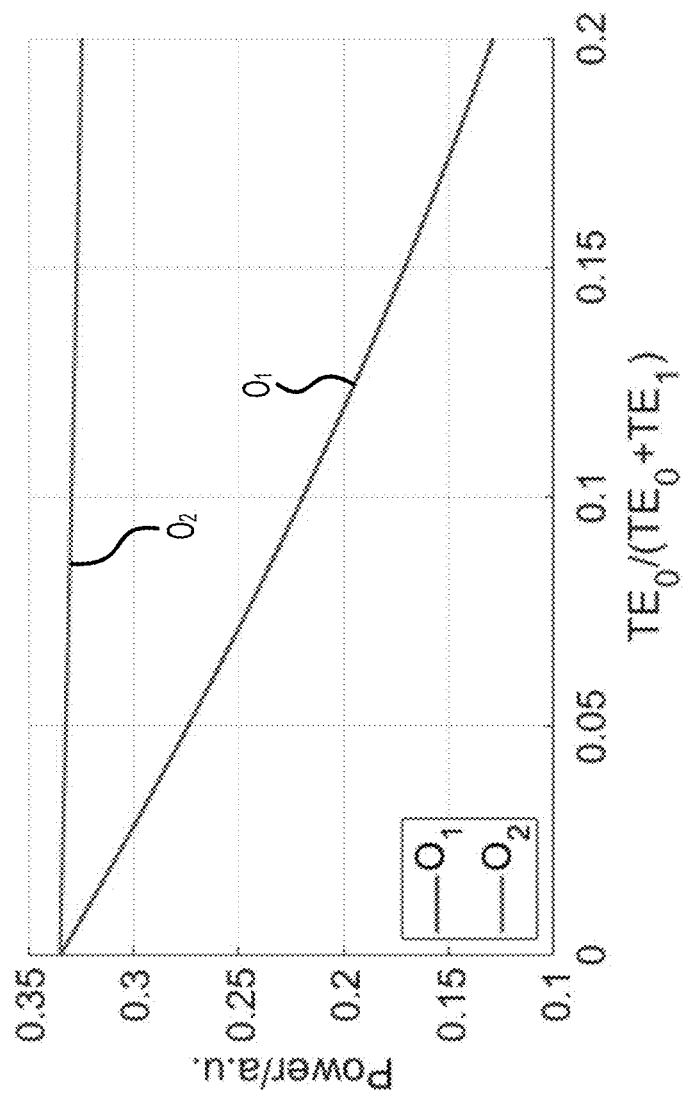
FIG. 15 illustrates a plot showing a simulated output of a multimode interference waveguide as a function of the ratio of $TE_0$ and $TE_1$ mode.

FIG. 15 illustrates a plot showing a simulated output of a multimode interference waveguide as a function of the ratio of $TE_0$ and $TE_1$ mode. As illustrated, simulations of the multimode interference waveguide using the eigenmode multimode interference expansion method (FIMMPROP, Photon Design) show that, while the output ratio of the $TE_0$ mode or the $TE_1$ mode is 50/50, the addition of the two modes gives a different result. As the percentage of the $TE_0$ mode increases, one of the outputs decreases. This allows the ratio of the $TE_0$ and $TE_1$ modes to be determined with the output light signal.

Figure 16:
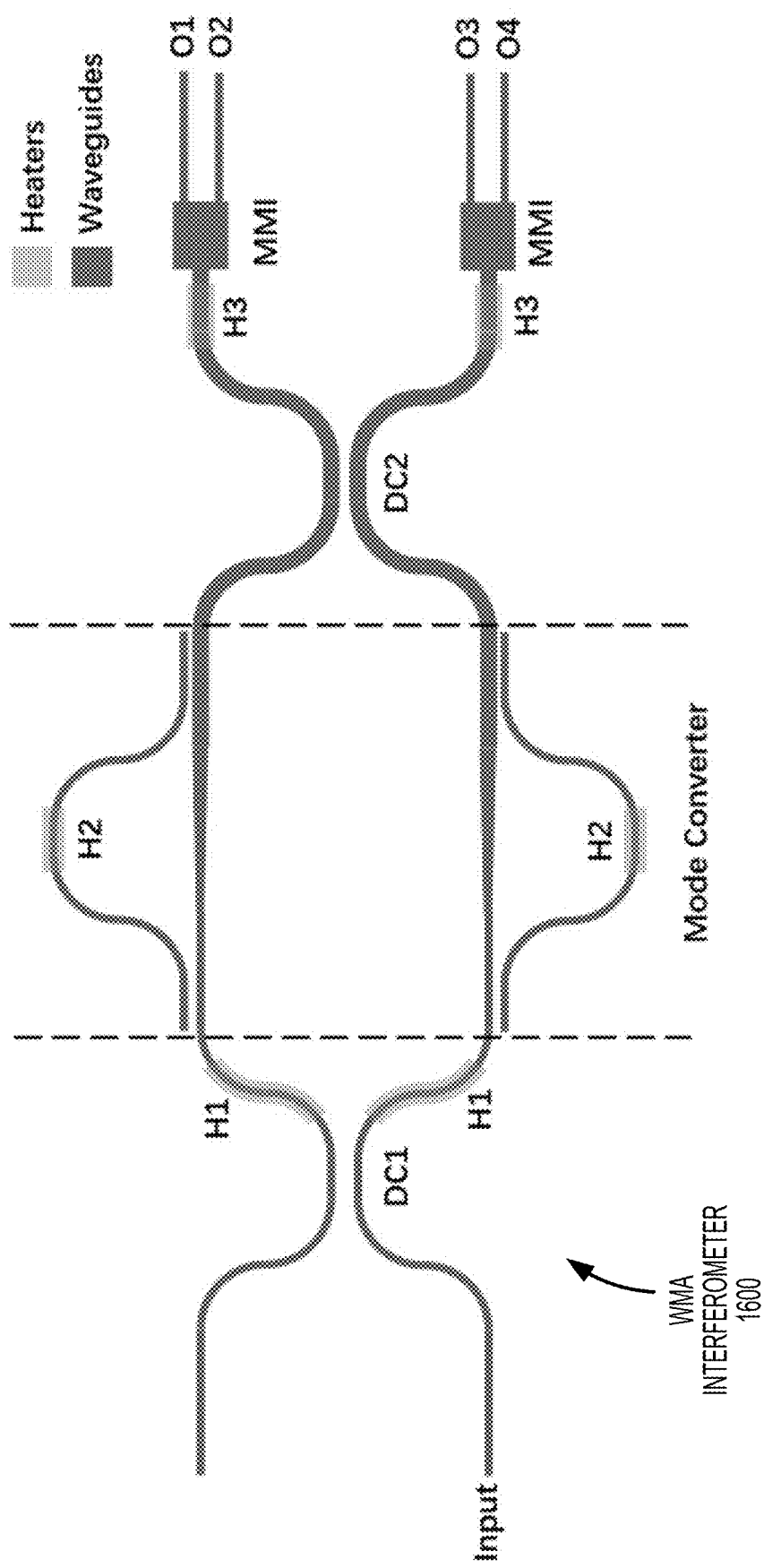
FIG. 16 illustrates an example layout of a WMA interferometer with heaters.

FIG. 16 illustrates an example layout of a WMA interferometer 1600 with heaters, according to some embodiments of the present invention. For the purpose of testing the device, a source of phase ϕ may be required. A common method to add phase tunability to waveguides is to use micro-heaters. By depositing metal wires on top of the waveguide cladding and applying voltage on them, they can generate heat and increase the temperature of the waveguide underneath. The temperature change will induce a refractive index change of the waveguide material, introducing a phase difference compared to the unheated waveguide. A first heater (H1) may be placed after the first directional coupler to introduce a deliberate phase difference for measurement.

Heaters are also useful for the undesired phase accumulation throughout the device due to fabrication errors. In theory, when phase ϕ=0, the $TE_0$ and $TE_1$ modes need to be in phase before they interfere. Other sources of phase accumulation will reduce the sensitivity of the measurement. To compensate for these undesired sources of phase, two other heaters may be placed on each path of the device to tune the two modes in phase before applying the target phase ϕ. Heater 2 (H2) may control the relative phase of the $TE_1$ mode to the $TE_0$ mode. Heater 3 (H3) may compensate for the phase difference between the $TE_0$ and $TE_1$ due to their different propagation velocities.

In some implementations, WMA interferometer 1600 can be fabricated from a 4-inch silicon wafer with 4 μm of thermally grown silicon dioxide. A layer of 289 nm of silicon nitride can be deposited with low pressure chemical vapor deposition (LPCVD). The waveguides can then be patterned with e-beam lithography and the silicon nitride can be etched with inductively coupled plasma reactive ion etching (ICP-RIE). The waveguides can be cladded with 2.6 μm of silicon dioxide deposited via plasma enhanced chemical vapor deposition (PECVD).

To place heaters on top of the waveguides, a "lift-off" method can be employed as follows. First, a layer of photoresist is spun on top of the silicon dioxide and the shape of the heaters can be patterned with DUV photolithography (ASML 300C DUV Stepper—248 nm). Then, deposit 10 nm of chrome is deposited for adhesion to the silicon dioxide and 100 nm of platinum as the heaters. Next, the wafer is immersed in acetone, which dissolves the photoresist and thus removes the extra metal. The metal left on the surface of the cladding forms the heaters over the waveguides.

Figure 17:
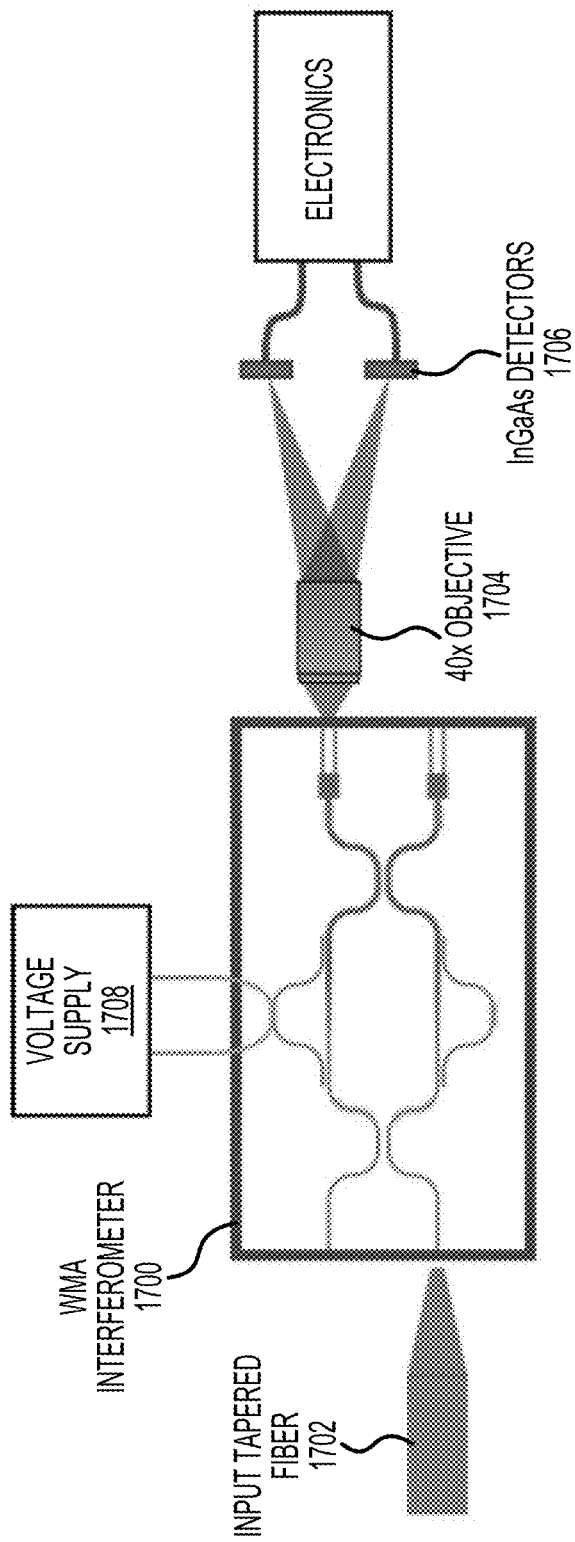
FIG. 17 illustrates an example of a testing setup for testing a WMA interferometer.

FIG. 17 illustrates an example of a testing setup for testing a WMA interferometer 1700. In some implementations, the light source for testing the device is a tunable laser centered at 1550 nm wavelength (Santec TSL-710). The power of the laser output is 1 mW. Light can be coupled into the waveguide with a tapered single mode fiber 1702 and the output can be imaged with a 40× objective 1704 onto InGaAs detectors 1706. Objective 1704 allows measurement of the two outputs of the MMI simultaneously by putting one detector at each output image location. A fiber polarization paddle can be used on the input fiber and a polarizer can be placed before the detector to eliminate the effects of stray TM modes.

To apply voltage to the heaters, metal probes that are attached to electric cables can be used. The probes can be put in contact with the heaters on the chip and the electric cables can be connected to a voltage source 1708. Without applying any voltage to the heaters, the wavelength of the laser can be scanned and the output spectrum of the device can be recorded. For clarity reasons, only a connection for one heater is illustrated.

Figure 18:
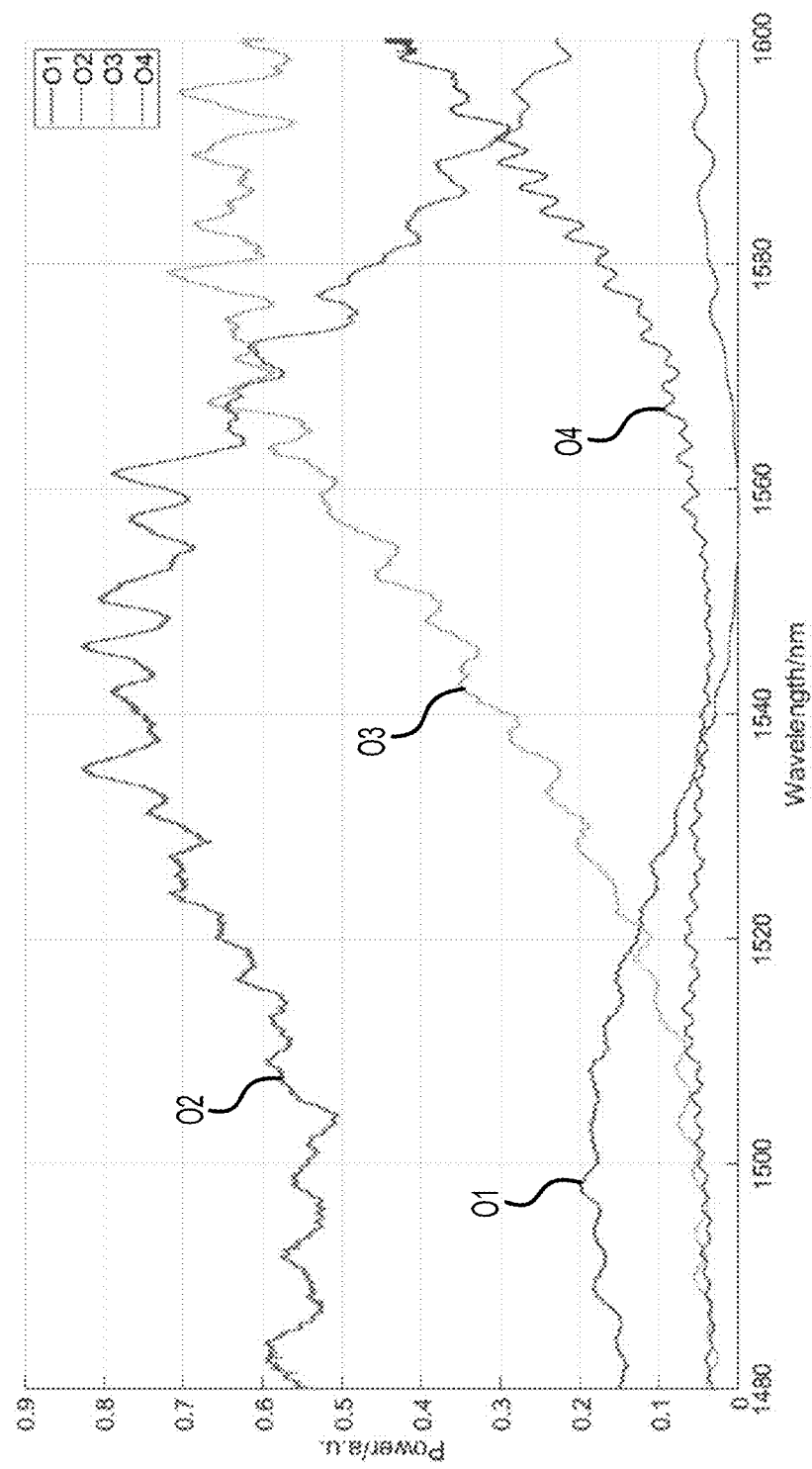
FIG. 18 illustrates a plot showing the output light power as a function of input laser wavelength.

FIG. 18 illustrates a plot showing the output light power as a function of input laser wavelength. The general trend of the spectrum shows the sinusoidal behavior we expect from a Mach-Zehnder interferometer. However, the ratio of the output powers is not as expected. This is most likely due to an undesired accumulation of phase, which can be compensated for by tuning heaters 2 and 3. The small fluctuation is due to the vibration of the input fiber during the scan. This can be largely improved by integrated photonics packaging techniques, such as fusing the fiber to the chip.

Because of the fiber fluctuation, it is difficult to determine the cause of light signal change when a constant phase signal is applied. Therefore, a modulated phase signal can be sent. When heater 1 is tuned with a sine wave voltage signal, a light signal with a corresponding frequency can be observed at the output.

Figure 19:
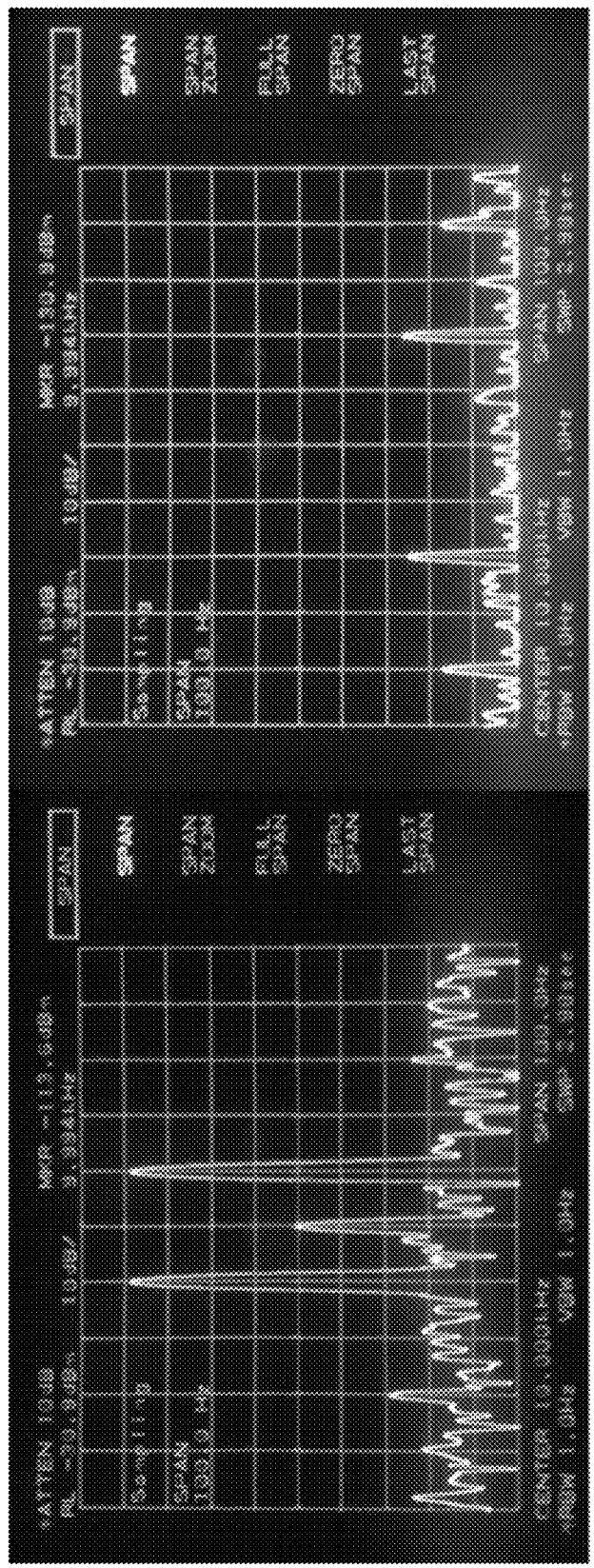
FIG. 19 illustrates plots showing a modulated voltage signal (on the left) and an output light signal (on the right) measured using an radio-frequency (RF) spectrum analyzer.

FIG. 19 illustrates plots showing a modulated voltage signal (on the left) and an output light signal (on the right) measured using an radio-frequency (RF) spectrum analyzer. The modulation frequency components from the signal generator are 9.99 kHz, 10 kHz and 10.01 kHz. Since the response of the refractive index goes as the square of the applied voltage (i.e. power dissipated by the heater), the difference between the frequency components doubles in the measured output light. Accordingly, signal frequencies of 9.98 kHz and 10.02 kHz can be observed at the output. This demonstrates the ability of the device to measure changes to the phase difference between the interferometer arms by detecting the output light.

Figure 20:
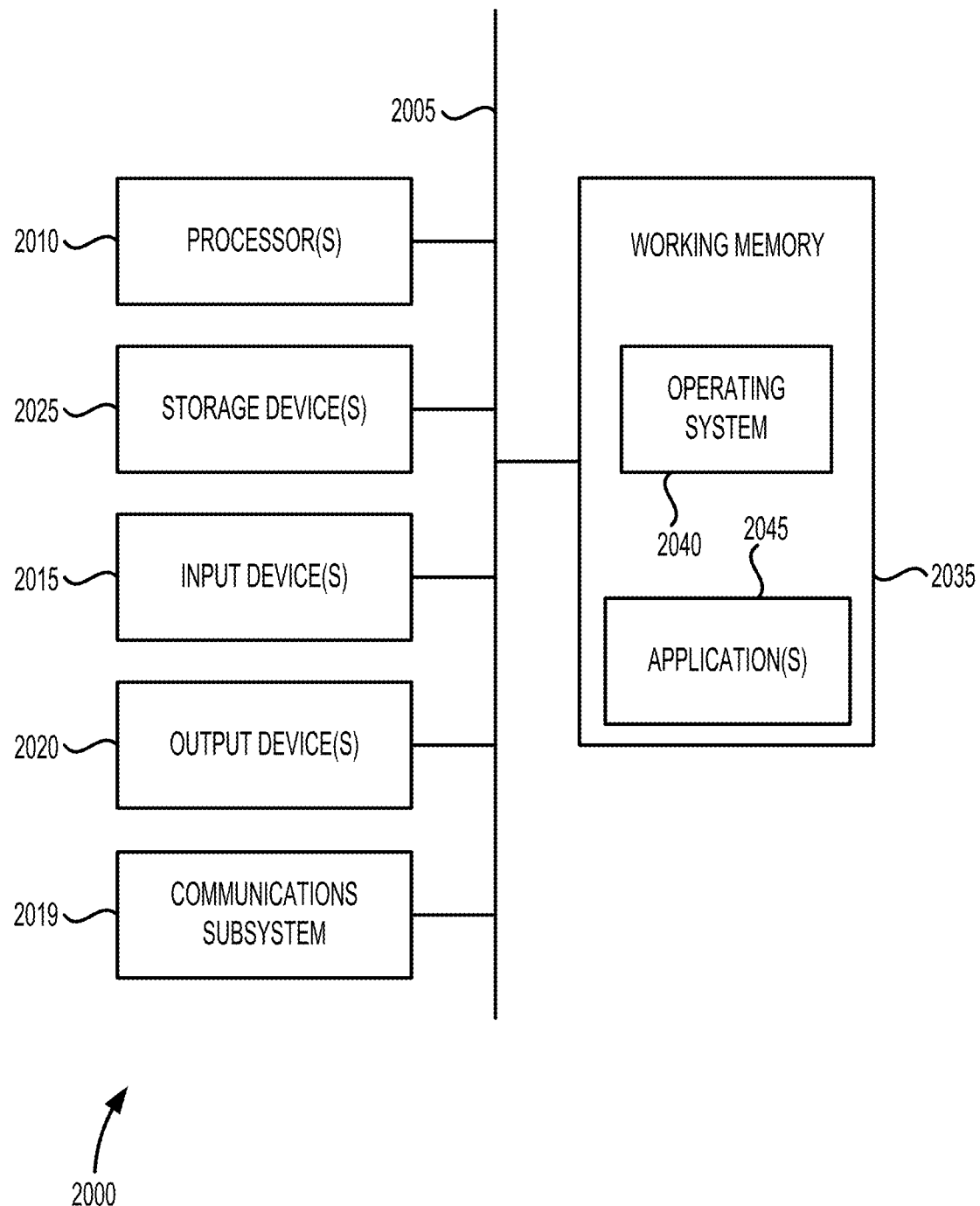
FIG. 20 illustrates a simplified computer system.

FIG. 20 illustrates a simplified computer system 2000 according to some embodiments described herein. Computer system 2000 as illustrated in FIG. 20 may be incorporated into devices such as transmitter module 110, receiver module 120, or control/processing electronics 130 as described herein. FIG. 20 provides a schematic illustration of one example of computer system 2000 that can perform some or all of the steps of the methods provided by various embodiments. It should be noted that FIG. 20 is meant only to provide a generalized illustration of various components, any or all of which may be utilized as appropriate. FIG. 20, therefore, broadly illustrates how individual system elements may be implemented in a relatively separated or relatively more integrated manner.

Computer system 2000 is shown comprising hardware elements that can be electrically coupled via a bus 2005, or may otherwise be in communication, as appropriate. The hardware elements may include one or more processors 2010, including without limitation one or more general-purpose processors and/or one or more special-purpose processors such as digital signal processing chips, graphics acceleration processors, and/or the like; one or more input devices 2015, which can include without limitation a mouse, a keyboard, a camera, and/or the like; and one or more output devices 2020, which can include without limitation a display device, a printer, and/or the like.

Computer system 2000 may further include and/or be in communication with one or more non-transitory storage devices 2025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 2000 might also include a communications subsystem 2019, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 2019 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 2019. In other embodiments, a portable electronic device, e.g. the first electronic device, may be incorporated into computer system 2000, e.g., an electronic device as an input device 2015. In some embodiments, computer system 2000 will further comprise a working memory 2035, which can include a RAM or ROM device, as described above.

Computer system 2000 also can include software elements, shown as being currently located within the working memory 2035, including an operating system 2040, device drivers, executable libraries, and/or other code, such as one or more application programs 2045, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 2025 described above. In some cases, the storage medium might be incorporated within a computer system, such as computer system 2000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 2000 and/or might take the form of source and/or installable code, which, upon compilation and/or installation on computer system 2000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 2000 to perform methods in accordance with various embodiments of the technology. According to a set of embodiments, some or all of the procedures of such methods are performed by computer system 2000 in response to processor 2010 executing one or more sequences of one or more instructions, which might be incorporated into the operating system 2040 and/or other code, such as an application program 2045, contained in the working memory 2035. Such instructions may be read into the working memory 2035 from another computer-readable medium, such as one or more of the storage device(s) 2025. Merely by way of example, execution of the sequences of instructions contained in the working memory 2035 might cause the processor(s) 2010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In embodiments implemented using computer system 2000, various computer-readable media might be involved in providing instructions/code to processor(s) 2010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 2025. Volatile media include, without limitation, dynamic memory, such as the working memory 2035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 2010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 2000.

The communications subsystem 2019 and/or components thereof generally will receive signals, and the bus 2005 then might carry the signals and/or the data, instructions, etc. carried by the signals to the working memory 2035, from which the processor(s) 2010 retrieves and executes the instructions. The instructions received by the working memory 2035 may optionally be stored on a non-transitory storage device 2025 either before or after execution by the processor(s) 2010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   receiving, at a port, a reflected signal generated by an interrogation signal being reflected off a remote vibrating target;
   propagating the reflected signal down a first waveguide;
   splitting, by a first beam splitter, the reflected signal into a first portion propagating down the first waveguide and a second portion propagating down a second waveguide;
   delaying, by a delay element, a phase of one of the first and second portions of the reflected signal;
   spatially phase shifting, by one or more spatial phase shifters, one or both of the first or second portions of the reflected signal;
   splitting, by a second beam splitter, the first and second portions of the reflected signal into a third portion propagating down the first waveguide and a fourth portion propagating down the second waveguide;
   detecting, by a split detector, an intensity difference between a first lobe and a second lobe of the third portion of the reflected signal; and
   calculating a Doppler frequency based on the intensity difference.

2. The method of claim 1, further comprising:
   modulating, by an interrogation laser, the interrogation signal at an interrogation frequency; and
   transmitting the interrogation signal to the remote vibrating target.

3. The method of claim 2, further comprising:
   expanding, by an afocal expander, the interrogation signal.

4. The method of claim 1, wherein the one or more spatial phase shifters include a mode exciter configured to excite a superposition of odd order modes in the reflected signal.

5. The method of claim 1, wherein:
   the first beam splitter causes a first mode of the reflected signal to split between the first and second portions of the reflected signal; and
   the second beam splitter causes destructive interference of the first mode of the first and second portions of the reflected signal such that the third portion of the reflected signal does not contain the first mode.

6. The method of claim 5, wherein:
   the second beam splitter causes constructive interference of a second mode of the reflected signal such that the third portion of the reflected signal contains the second mode.

7. The method of claim 1, further comprising:
   collecting, by a receiver telescope, the reflected signal from a specific target location within a field of view; and
   imaging, by the receiver telescope, the reflected signal onto a tapered fiber coupler coupled to the port.

8. The method of claim 1, wherein:
   the first beam splitter is formed by positioning a first region of the first waveguide and a first region of the second waveguide within a first threshold distance from each other; and
   the second beam splitter is formed by positioning a second region of the first waveguide and a second region of the second waveguide within a second threshold distance from each other.

9. The method of claim 1, wherein the delay element is positioned along the second waveguide so as to delay the phase of the second portion of the reflected signal.

10. The method of claim 1, wherein the delay element includes a Bragg grating.

11. A vibrometer for performing remote sensing using weak measurement amplification (WMA), the vibrometer comprising:
    a transmitter module configured to transmit an interrogation signal to a remote vibrating target, the transmitter module comprising:
      an interrogation laser configured to modulate the interrogation signal at an interrogation frequency;
    a receiver module comprising:
      a WMA interferometer comprising:
        a first port configured to receive a reflected signal generated by the interrogation signal being reflected off the remote vibrating target, wherein the reflected signal contains the interrogation frequency and a Doppler frequency;
        a first waveguide coupled to the first port and configured to propagate the reflected signal;
        a second waveguide;
        a first beam splitter configured to split the reflected signal into a first portion propagating down the first waveguide and a second portion propagating down the second waveguide;

a delay element positioned along one of the first waveguide and the second waveguide and configured to delay a phase of one of the first and second portions of the reflected signal;

one or more spatial phase shifters configured to spatially phase shift one or both of the first and second portions of the reflected signal;

a second beam splitter configured to split the first and second portions of the reflected signal into a third portion propagating down the first waveguide and a fourth portion propagating down the second waveguide; and a split detector configured to detect an intensity difference between a first lobe and a second lobe of the third portion of the reflected signal; and a processor configured to calculate the Doppler frequency based on the intensity difference.

12. The vibrometer of claim 11, wherein the one or more spatial phase shifters include a mode exciter configured to excite a superposition of odd order modes in the reflected signal.

13. The vibrometer of claim 11, wherein the transmitter module further comprises:

an afocal expander configured to expand the interrogation signal.

14. The vibrometer of claim 11, wherein:

the first beam splitter causes a first mode of the reflected signal to split between the first and second portions of the reflected signal; and the second beam splitter causes destructive interference of the first mode of the first and second portions of the reflected signal such that the third portion of the reflected signal does not contain the first mode.

15. The vibrometer of claim 14, wherein:

the second beam splitter causes constructive interference of a second mode of the reflected signal such that the third portion of the reflected signal contains the second mode.

16. The vibrometer of claim 11, wherein the receiver module further comprises:

a receiver telescope configured to collect the reflected signal from a specific target location within a field of view and image the reflected signal onto a tapered fiber coupler coupled to the first port.

17. The vibrometer of claim 11, wherein:

the first beam splitter is formed by positioning a first region of the first waveguide and a first region of the second waveguide within a first threshold distance from each other; and the second beam splitter is formed by positioning a second region of the first waveguide and a second region of the second waveguide within a second threshold distance from each other.

18. An apparatus comprising:

a first port configured to receive a reflected signal generated by an interrogation signal being reflected off a remote vibrating target;

a first waveguide coupled to the first port and configured to propagate the reflected signal;

a second waveguide;

a first beam splitter configured to split the reflected signal into a first portion propagating down the first waveguide and a second portion propagating down the second waveguide;

a delay element positioned along one of the first waveguide and the second waveguide and configured to delay a phase of one of the first and second portions of the reflected signal;

one or more spatial phase shifters configured to spatially phase shift one or both of the first and second portions of the reflected signal;

a second beam splitter configured to split the first and second portions of the reflected signal into a third portion propagating down the first waveguide and a fourth portion propagating down the second waveguide; and a split detector configured to detect an intensity difference between a first lobe and a second lobe of the third portion of the reflected signal.

19. The apparatus of claim 18, wherein the one or more spatial phase shifters include a mode exciter configured to excite a superposition of odd order modes in the reflected signal.

20. The apparatus of claim 18, wherein the delay element includes a Bragg grating.

* * * * *